Feb. 14, 1967  T. J. RADCLIFFE ET AL  3,304,241
SAFETY CONTROL APPARATUS FOR COKE OVEN BATTERIES
Filed Sept. 12, 1961  10 Sheets-Sheet 2
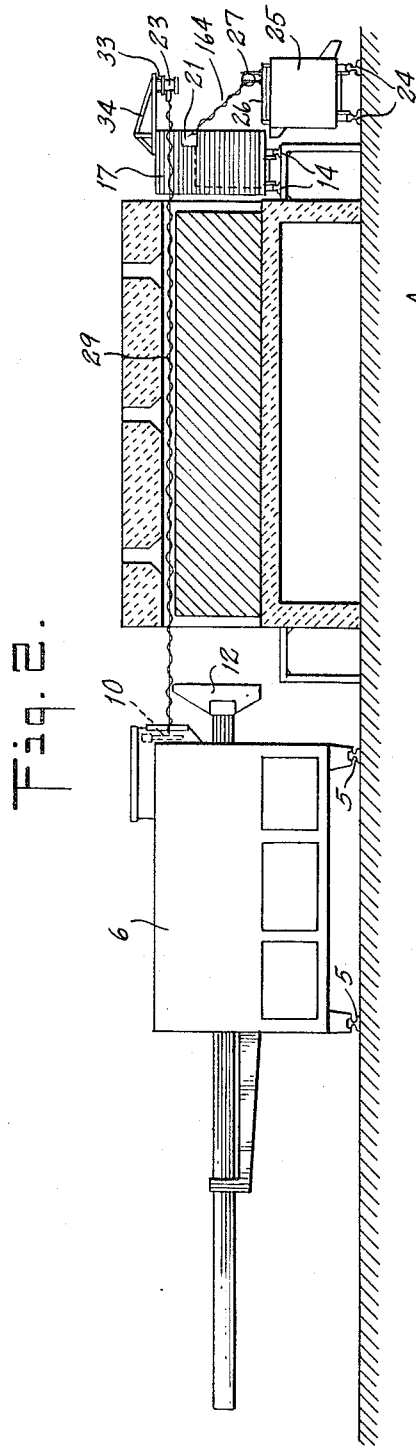
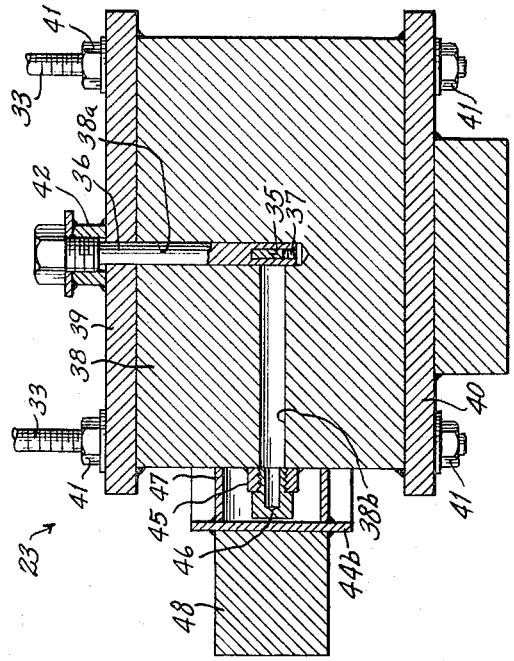
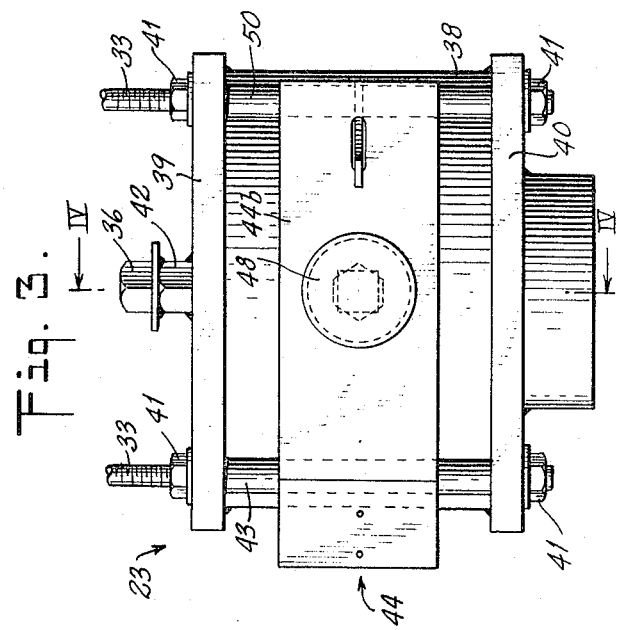
INVENTORS
THOMAS J. RADCLIFFE
DANIEL M. McELHANEY
BY  DANIEL F. HAVEL
N. H. Woodlief
ATTORNEY

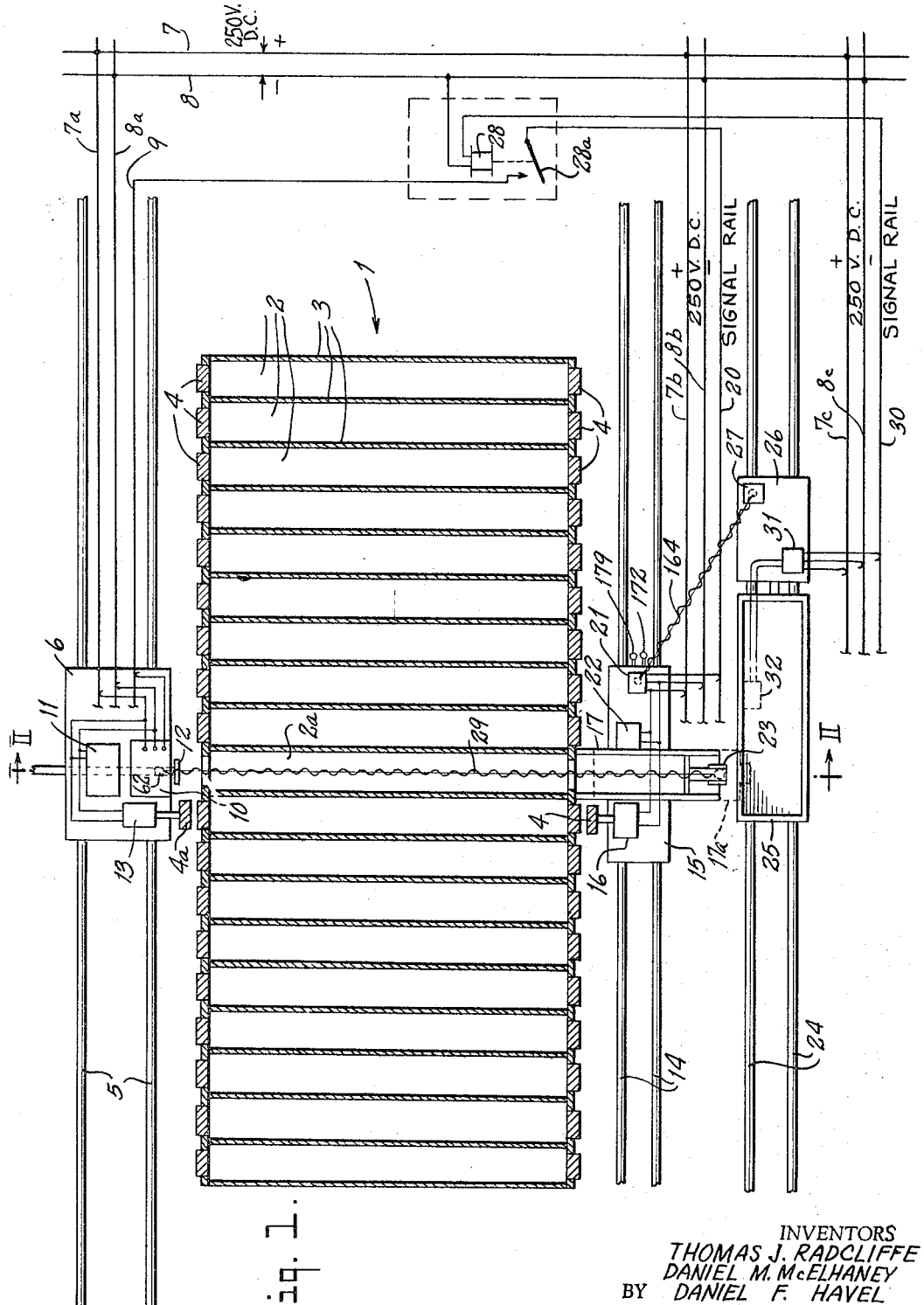

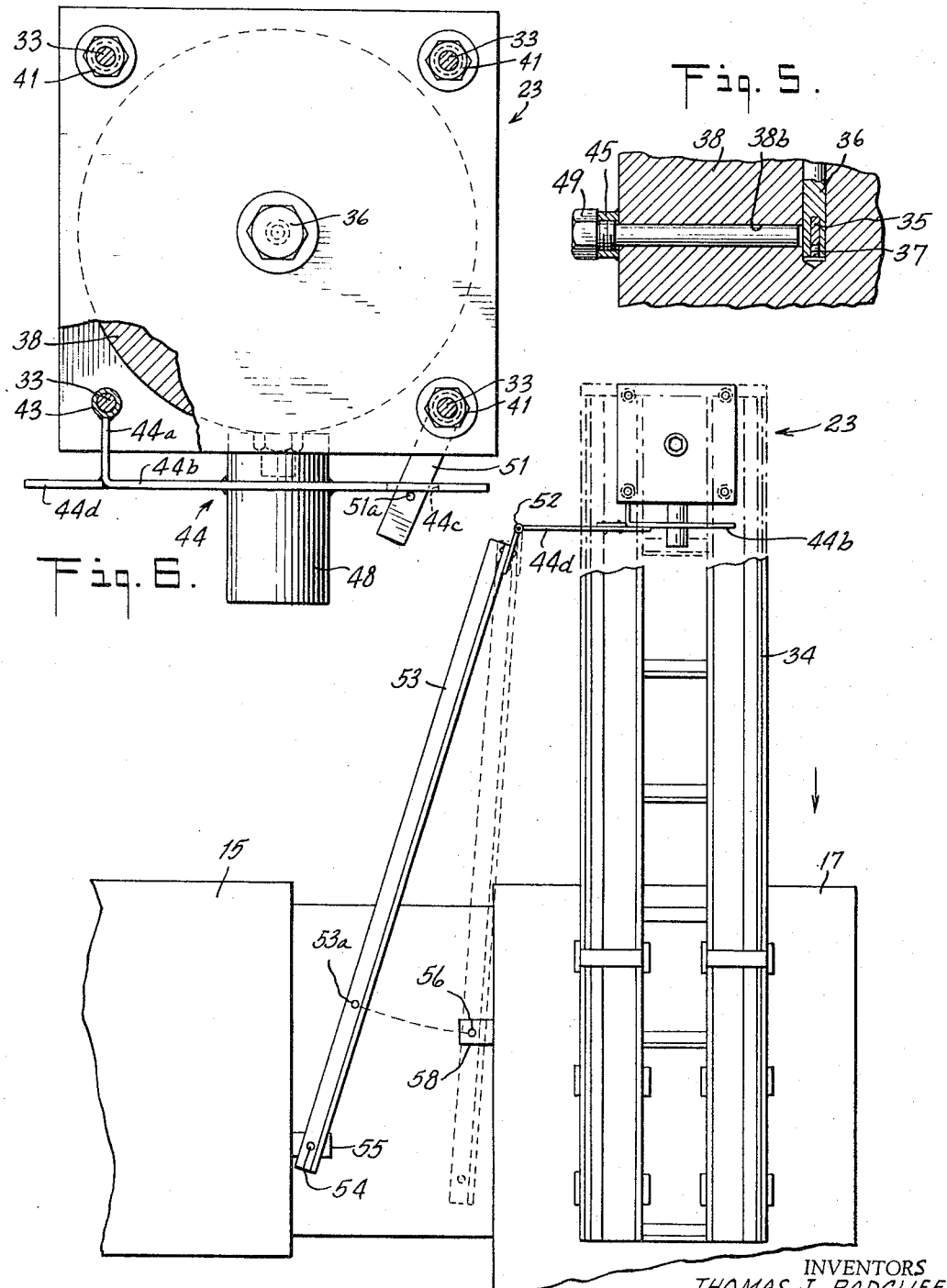

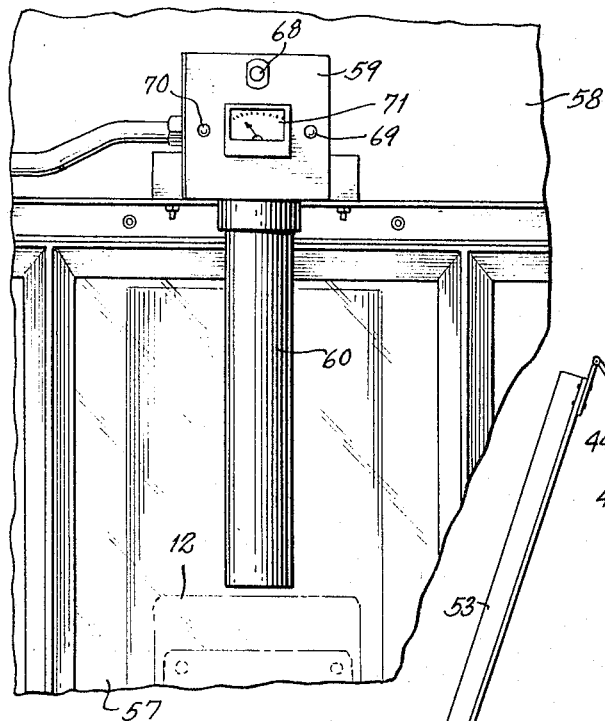
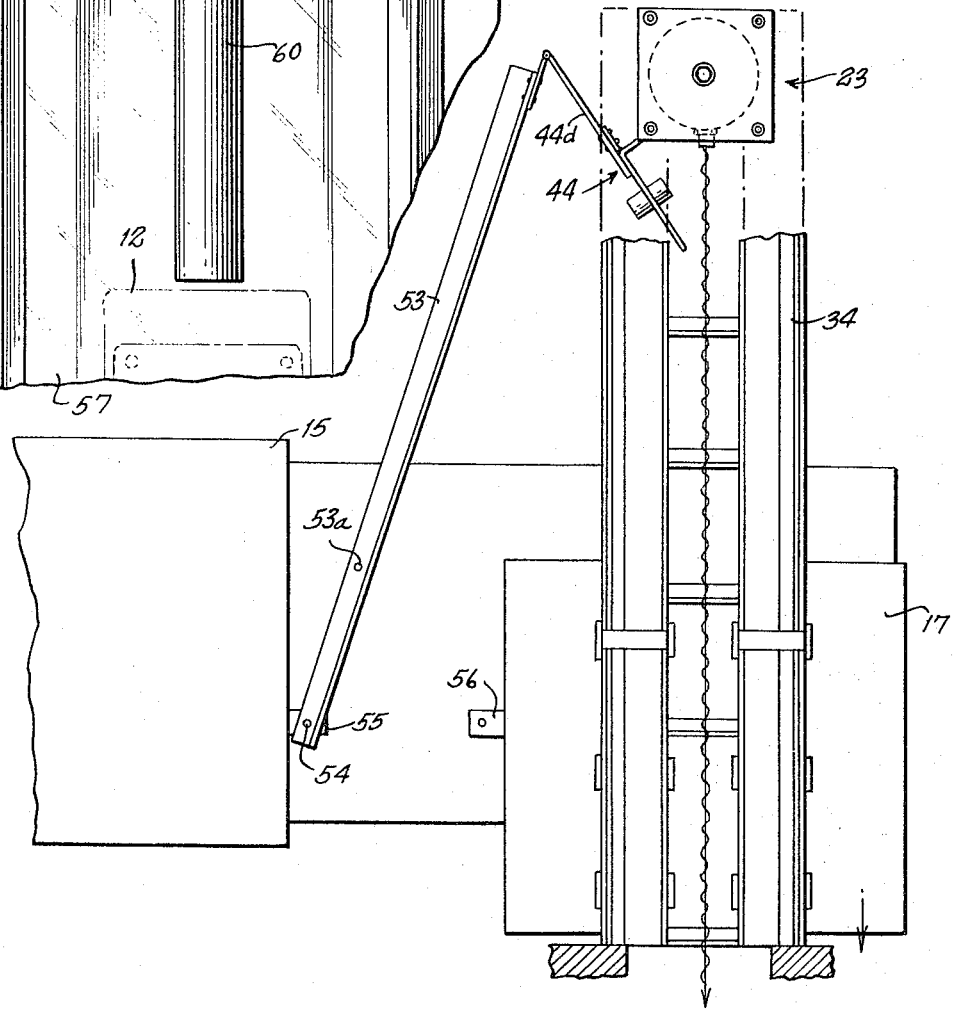

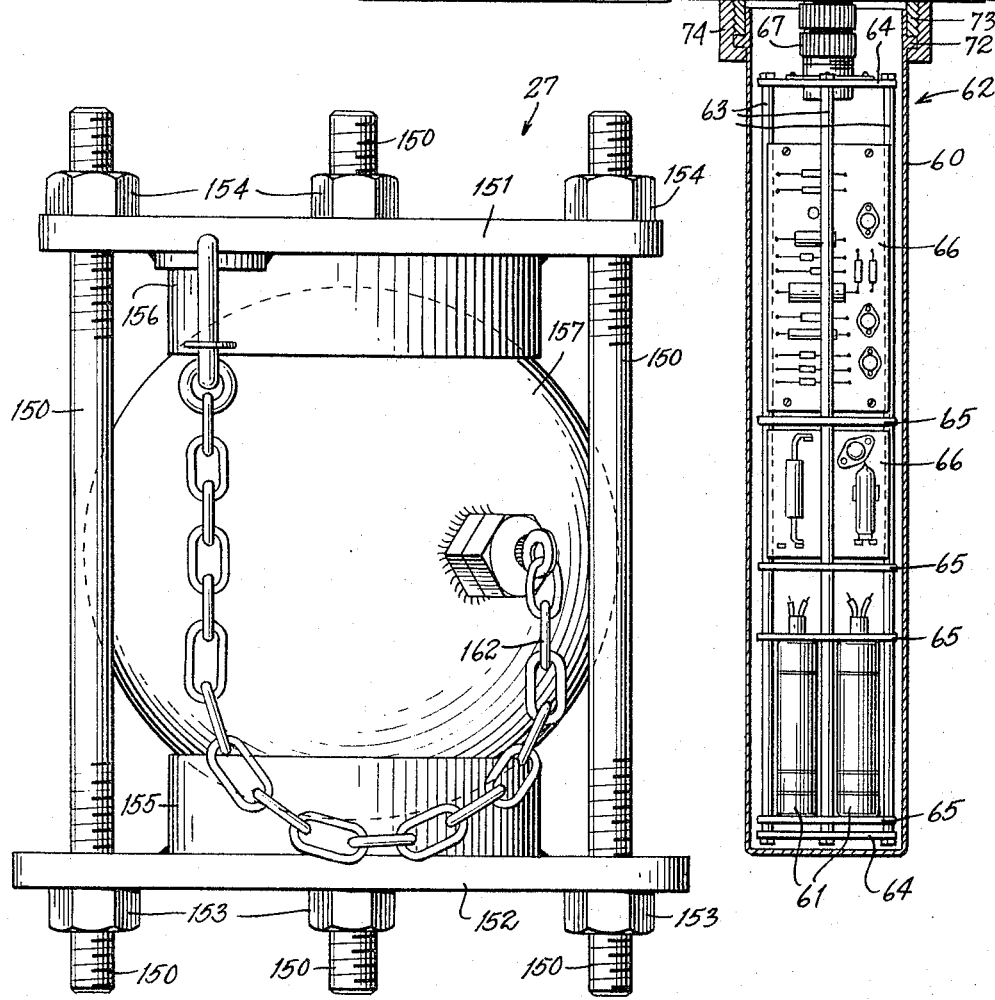

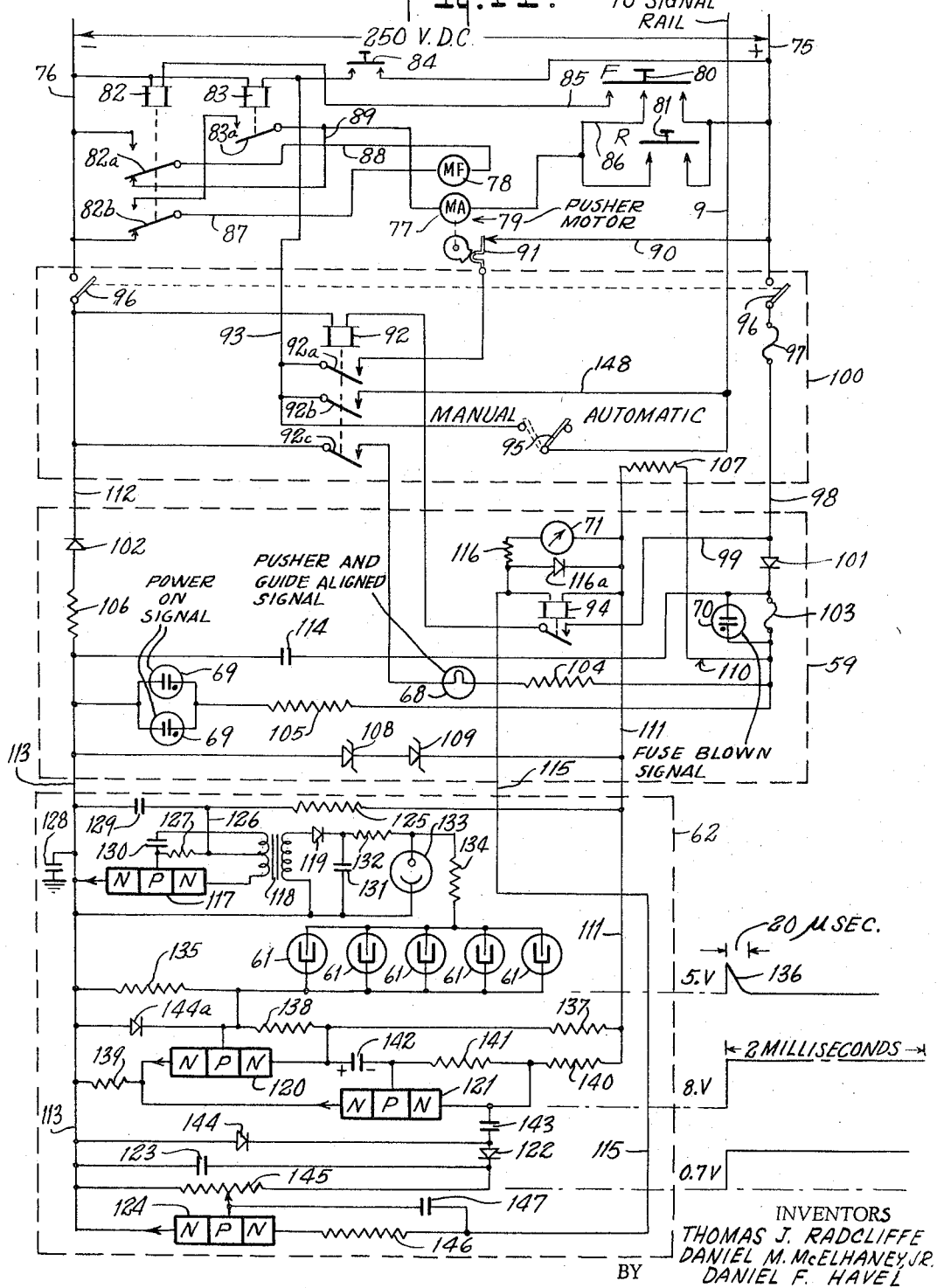

Feb. 14, 1967 T. J. RADCLIFFE ET AL 3,304,241
SAFETY CONTROL APPARATUS FOR COKE OVEN BATTERIES
Filed Sept. 12, 1961 10 Sheets-Sheet 7

INVENTORS
THOMAS J. RADCLIFFE
DANIEL M. McELHANEY, JR.
BY DANIEL F. HAVEL
*H. H. Woodlief*
ATTORNEY

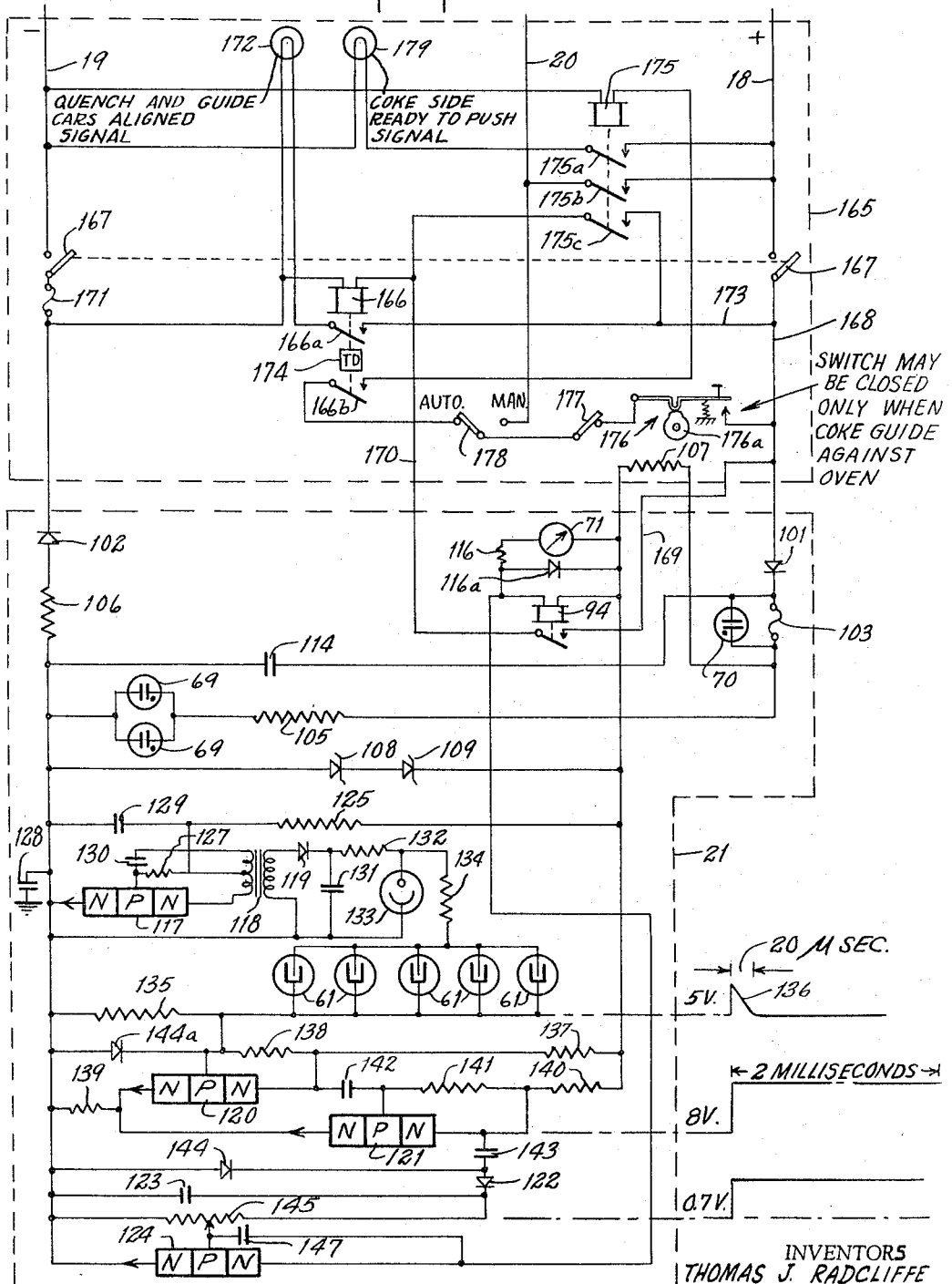

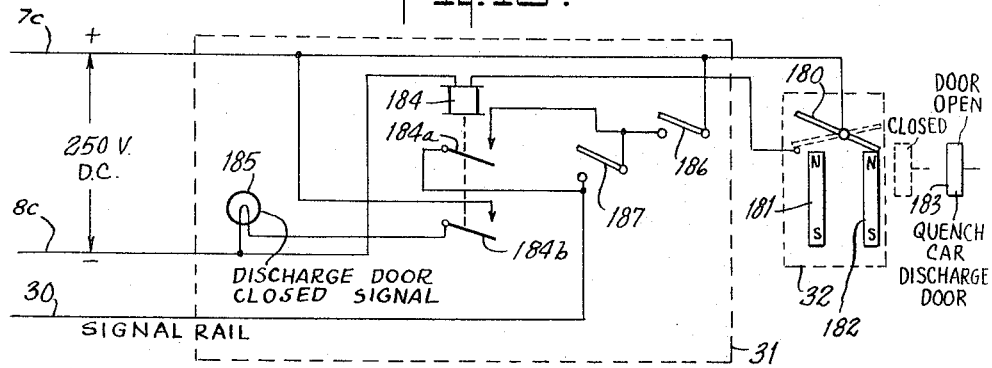
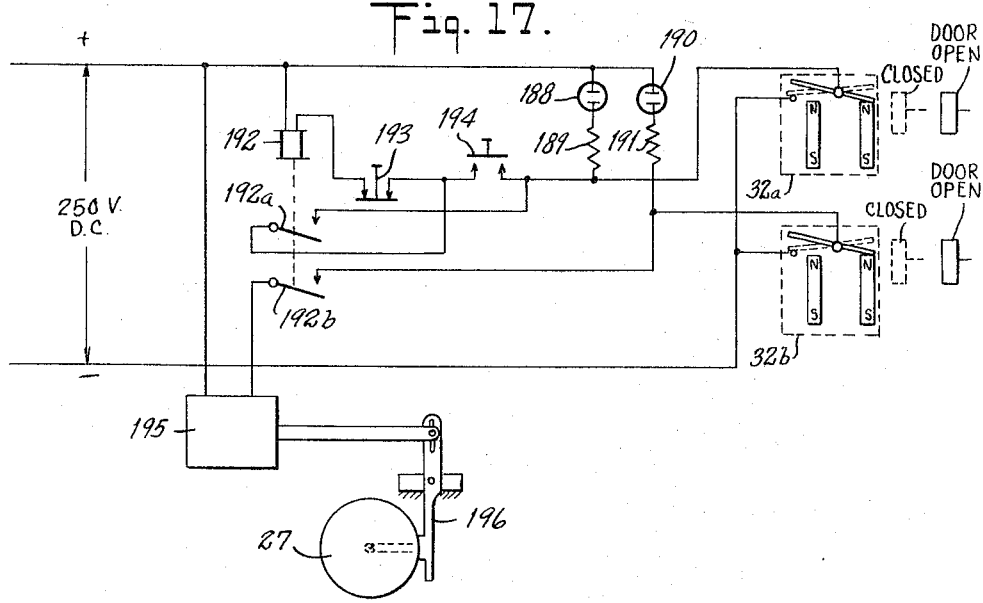
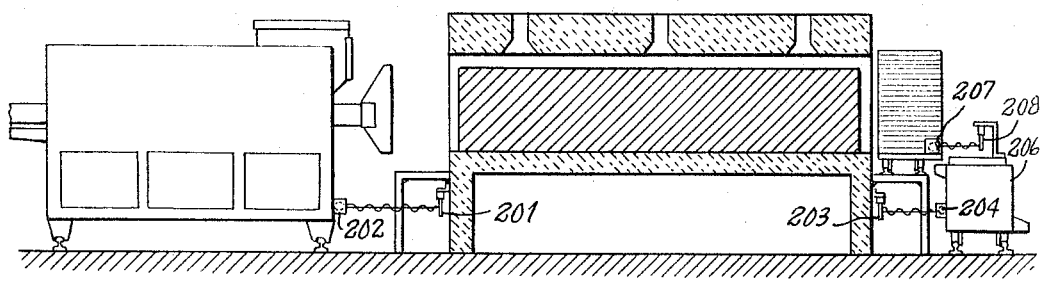

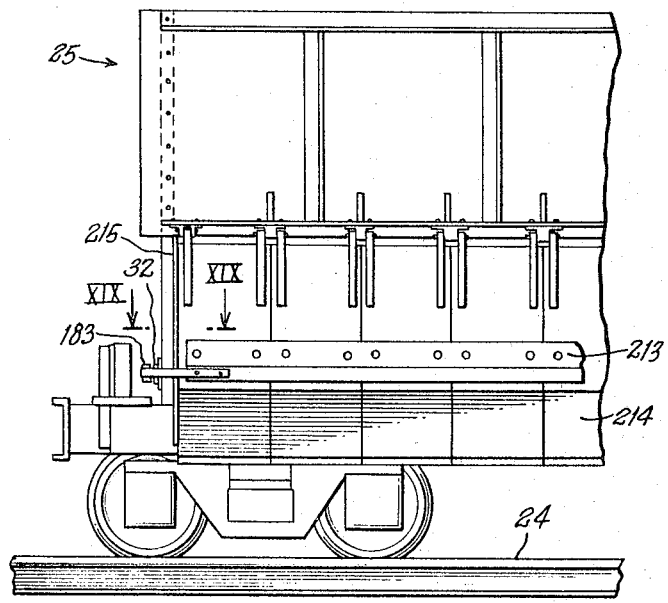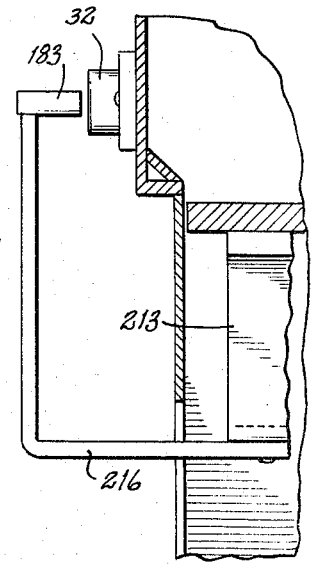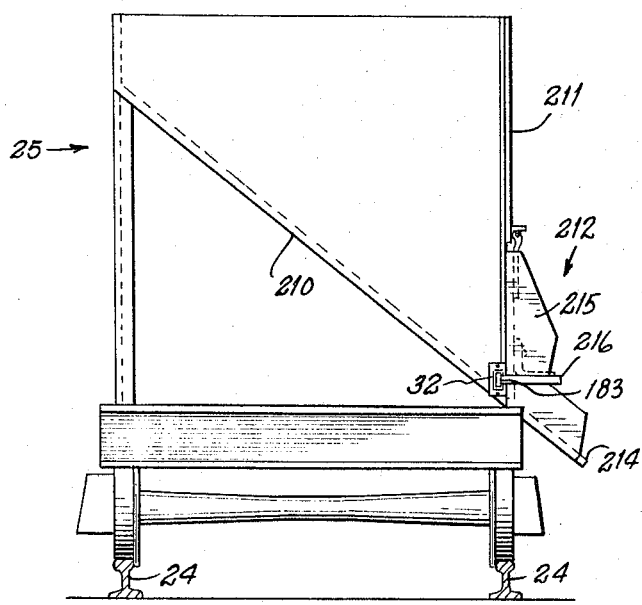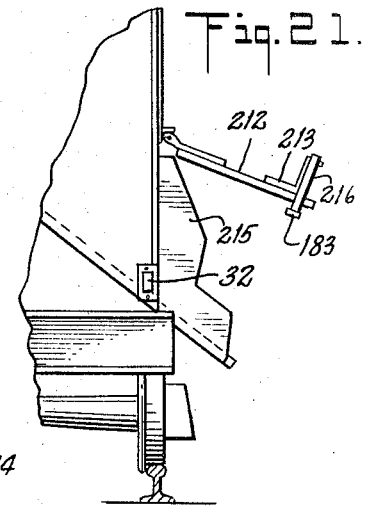

3,304,241
**SAFETY CONTROL APPARATUS FOR
COKE OVEN BATTERIES**
Thomas J. Radcliffe, Warrensville Heights, Daniel M.
McElhaney, Euclid, and Daniel F. Havel, Cleveland,
Ohio, assignors to Republic Steel Corporation, Cleveland, Ohio, a corporation of New Jersey
Filed Sept. 12, 1961, Ser. No. 137,588
9 Claims. (Cl. 202—262)

This invention relates to safety control apparatus. The invention is illustrated herein as applied to interlocking control apparatus for a coke oven battery. While some features of the invention are of particular utility in connection with coke oven batteries and other features are of particular utility in connection with interlocking control systems, many features of the invention are of more general utility in connection with automatic control apparatus generally.

Coke is produced by distilling coal, commonly in retort ovens. Modern coke ovens are built in batteries of 50 or 100 or more ovens. Each oven is commonly rectangular in its horizontal and vertical cross-sections. A typical oven may be 40 feet in length, 14 feet in height and two or three feet wide. In the battery, the long sides of the ovens are formed by parallel brick walls, and the short sides of the ovens are aligned to form the side walls of the battery. The ovens are filled with coal from the top, through suitable doors.

The removal of the finished coke is accomplished by removing doors on the short sides of an oven, and advancing a ram from one side to push the coke out the other side. Along one side of the battery, known as the pusher side, an electrically powdered pusher car runs on a suitable track. The pusher car carries a door machine which is capable of engaging and removing a door from an oven. The pusher car also carries a large ram or pusher. The pusher car is first operated to bring its door machine into alignment with an oven to remove the door. After the door is removed, the pusher car is moved along the track to align the ram with the opened oven.

Along the opposite side of the battery, known as the coke side, there is provided immediately adjacent the battery, a track on which a guide car moves. The guide car carries a pair of parallel guide structures, and also carries a door machine for removing doors on that side of the battery. After a door is removed by the door machine, the guide car is then operated along the track to bring the coke guides into alignment with the sides of the open oven.

Parallel to the guide car track, on the outer side thereof from the oven, and usually on a lower lever, is another track on which a quench car is operated by a locomotive. The quench car is a hopper car built especially for receiving red hot coke.

When an oven it to be unloaded, after the charge of coal has been completely distilled to make coke, the oven is emptied by opening the doors at its opposite ends, aligning the pusher, the coke guides and the quench car and then operating the ram through the oven to push the red hot coke out through the guides and into the quench car.

It is impossible for the operator in the pusher car to observe the position of the guide car and the quench car, since they are located on the opposite side of the massive battery from him. Similarly, the operators in those cars cannot observe the position of the pusher car. It is essential that all three of the cars be lined up on the same oven before any attempt is made to push the coke out. Furthermore, in wet or snowy weather, the visibility around the quench car and guide car may be very poor due to steam and vapor arising from the contact of the moisture in the air with the red hot coke. All these factors contribute to make it very difficult for the operators of the cars to see exactly what is going on and to make sure that the coke is properly loaded into the quench car.

It has been proposed (see British Patents No. 801,116 and 801,117) to mount a radioactive source on a guide car and to mount a radiation detector on the pusher car. The radioactive source directs a beam of rays through the top of the oven above the coke therein. When the beam of rays impinges on the detector on the pusher car, the detector actuates a signal to show that the pusher car and the coke guide car are aligned with the same oven and that both doors are off the oven. The present invention utilizes a radioactive source and a radiation detector of the general type shown in the British patents.

An object of the present invention is to provide improved safety interlocking controls for coke oven batteries.

Another object is to provide an improved interlocking control between the coke guide car and the pusher car in a coke oven battery.

Another object is to provide an improved interlocking control between the quench car and the pusher car in a coke oven battery.

Another object is to provide an improved interlocking control between the quench car discharge doors and the pusher car in a coke oven battery.

Another object is to provide improved radiation detecting apparatus, including an improved structure of the radiation detecting unit and improved electrical circuitry for operating a relay in response to the detection of a beam of radiation.

Another object of the invention is to provide improved source holders for radioactive materials used in such safety systems.

Another object is to provide improved interlocking control apparatus.

Another object is to provide improved means for detecting the position of a vehicle.

The foregoing and other objects are attained in the apparatus described herein. In the principal modification of the invention described, a radioactive source is mounted on a coke guide and is provided with a shutter which normally blocks the beam of radiation of the source. The coke guide is of the so-called racking type, i.e., it is movable between an outer traveling position spaced from the coke oven battery in which it may travel freely along the side of the battery and a guiding position where it abuts the battery. Before discharging coke from an oven, the coke guide must be moved from its traveling position to its guiding position. The shutter is linked to a part of the guide car which does not move with the coke guide, so that the shutter is opened by the movement of the coke guide as it moves to its guiding position. A lockout arrangement is provided on the interlocking linkage by which the shutter may be prevented from opening, for example, during repair work on the coke guide or on the radioactive source.

The source is mounted on the end of a bolt and is enclosed in a massive steel block having a vertical bore and a horizontal bore which meet near the center of the block. The bolt carrying the source is inserted through the vertical bore. The beam of radiation passes out through the horizontal bore. Another bolt is provided during shipment to fill substantially completely the horizontal bore, thereby blocking the escape of radioactive rays from the source. When the source is in use, the shipping bolt is removed and replaced by a small plug which permits the passage of radiation when the shutter is open.

The detector unit is mounted in a window of the control cab on the pusher car. The Geiger tubes which form the sensitive element of the detector are located in a cylinder which extends downwardly from the top of the window frame. The detector unit is of modular construction. That is to say, the cylindrical housing containing the Geiger tubes may be separated as a unit from the indicator box unit from which it depends. The circuit actuated by the Geiger tubes includes a monostable multivibrator which initiates an elongated output pulse each time that a ray impinges on a Geiger tube. The output of the monostable multivibrator is fed to an integrator whose output is amplified and used to control a relay. The circuit components are selected so that the relay is energized in response to a relatively low level of radiation. The relay controls a signal to inform the pusher car operator that everything on the coke side of the oven is ready for the push to begin. It also controls an interlocking contact in a circuit which must be completed in order for the pusher ram to be driven in the forward or pushing direction.

Another radioactive source is mounted on the roof of the quench car locomotive and a detector is mounted on the roof of the guide car. The roof mounting keeps the beam of radiation out of the normal paths of movement of operating personnel. The source on the quench car is provided with a universal mounting so that the direction of its beam may be adjusted and aimed at the detector mounted on the guide car.

Several interlocking circuits are disclosed for connecting the detector on the guide car with the detector on the pusher car. Typically, these circuits employ signal rails which are contacted by trolleys or shoes on the quench car, guide car and pusher car. Such signal rails are common in coke oven batteries, although not universal.

Apparatus is provided for sensing the closure of the discharge door on the bottom of the quench car. This sensing apparatus is interlocked with the other controls so that the pusher cannot be operated unless the quench car discharge door is closed. In order that the final signal to the pusher car operator to operate the ram may not be given accidentally when the quench car locomotive happens to be passing the guide car, one of the relays in the interlocking system is provided with a time delay so that the detector on the guide car must detect a beam of radioactive energy for a predetermined period, e.g., a few seconds, so that the signal to push the coke is not given to the pusher car operator until the quench is fully stopped in alignment with the oven to be pushed.

In accordance with a further feature of the invention, the pusher ram is free to move to a position against the face of the coke in the oven before a signal is received from the coke side of the oven. By moving the pusher up against the coke face, the coke is prevented from spilling out that side of the oven accidentally, while waiting for the quench car and guide car to be aligned.

Other objects and advantages of the invention will become apparent from a consideration of the following specification and claims, taken together with the accompanying drawings.

In the drawings:

FIG. 1 is a somewhat diagrammatic plan view of a coke oven battery provided with safety control apparatus embodying the invention;

FIG. 2 is a somewhat diagrammatic sectional view taken along the line II—II of FIG. 1;

FIG. 3 is an elevational view of one form of radioactive source holder conntructed in accordance with the invention;

FIG. 4 is a cross-sectional view taken on the line IV—IV of FIG. 3;

FIG. 5 is a fragmentary cross-sectional view similar to FIG. 4, showing a shipping bolt in the source holder;

FIG. 6 is a view partly in plan and partly in section, of the source holder of FIGS. 3 and 4;

FIG. 7 is a somewhat diagrammatic plan view showing the source holder of FIGS. 4 to 6 mounted on the guide car and a linkage which connects the shutter of the source holder to the guide car;

FIG. 8 is a view similar to FIG. 7, showing the guide and the source moved to their operating positions;

FIG. 9 is an elevational view taken from inside the pusher car control cab, showing the radiation detector unit;

FIG. 10 is a view partly in section and partly in elevation, showing the interior of the radiation detector unit;

FIG. 11 is a wiring diagram of the circuit of the radiation detector unit;

FIG. 12 is an elevational view of another form of source holder constructed in accordance with the invention;

FIG. 15 is a wiring diagram of the circuit for the detector mounted on the guide car;

FIG. 16 is a wiring diagram for one form of quench car discharge door detector;

FIG. 17 is a wiring diagram showing another modification of the quench car discharge door detector;

FIG. 18 is a fragmentary elevational view of a quench car, showing the mounting of the quench car discharge door detector;

FIG. 19 is a sectional view taken on the line XIX—XIX of FIG. 18, looking in the direction of the arrows;

FIG. 20 is an end elevational view of the quench car of FIG. 18, with the discharge door closed;

FIG. 21 is a fragmentary view similar to FIG. 20, showing the discharge door open; and FIG. 22 is a view similar to FIG. 2, illustrating a modified form of interlocking apparatus.

FIGS. 1 AND 2

Figure 13:
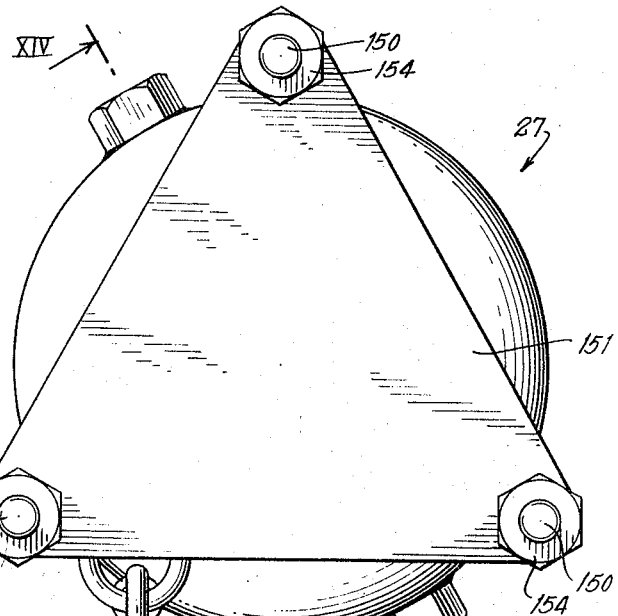
FIG. 13 is a plan view of the source holder of FIG. 12.
Figure 14:
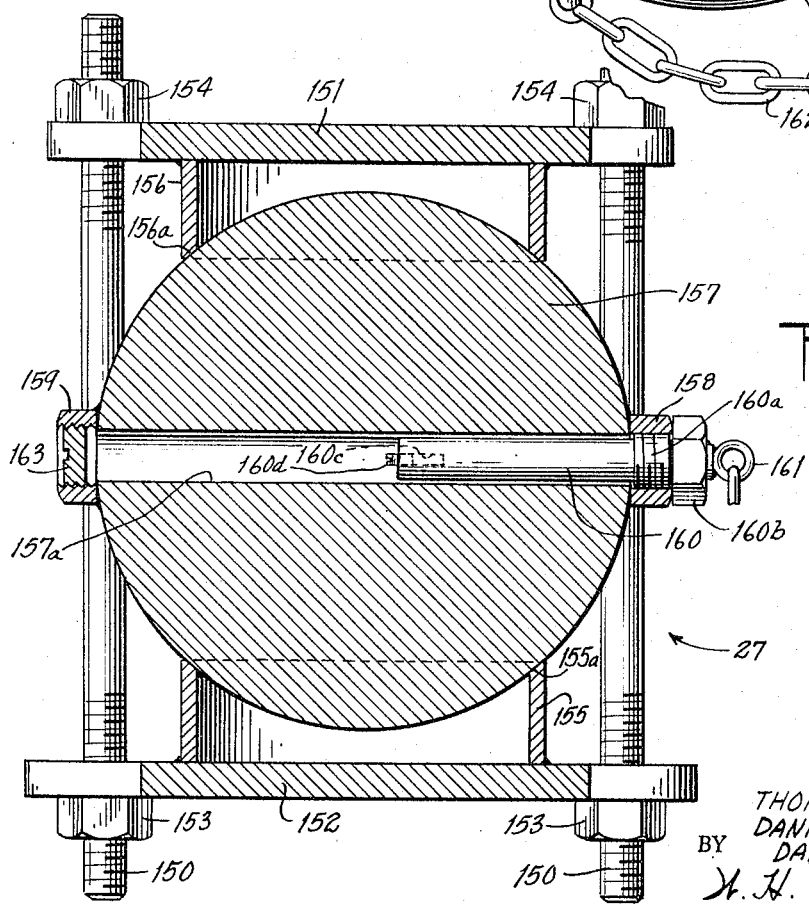
FIG. 14 is a cross-sectional view taken on the line XIV—XIV of FIG. 13.

FIGS. 1 and 2 show a coke oven battery generally indicated at 1, consisting of a plurality of ovens 2, separated by refractory brick walls 3. Each oven is provided at its opposite ends with removable doors 4, which may be of any suitable construction, many of which are well known.

The upper side of the coke oven battery 1, as it appears in FIG. 1, is the pusher side. Along that side of the battery is provided a pair of rails 5 on which runs a pusher car 6, usually electrically powered through a pair of overhead conductors 7a, 8a, commonly termed "power rails." The track 5 is also provided with another overhead conductor 9 commonly termed a signal rail. Electricity is conducted from the power rail 7a and 8a and the signal rail 9 through suitable trolleys and wires to a detector unit 10 illustrated diagrammatically in FIG. 1. Power is also supplied from the rails 7a and 8a to a motor control unit 11 which controls a motor driving a pusher ram 12. Power is also supplied from the rails 7 and 8 to a door machine 13, which may be of conventional construction and which may be operated to engage any of the doors 4 and remove it outwardly away from the oven.

The apparatus is shown in the drawings with the parts in the positions which they take up after the door machine 13 has removed the door 4, from a particular oven 2a and has moved it outwardly, and the pusher car 6 has moved to the left along the rails 5 to bring the pusher ram 12 into alignment with the open oven 2a.

The lower side of the oven, as viewed in FIG. 1, is the coke side of the oven battery. Along the coke side is a pair of rails 14 on which runs a guide car 15. The guide car carries a door machine 16, which may be of conventional construction, similar to the door machine 13. The guide car 15 also carries a coke guide 17 which is movable from the guiding position shown in full lines in the drawing, where its upper end abuts the wall of the coke oven, outwardly (or downwardly as it appears in the drawing) to a dotted line position 17a, where the coke guide is free to travel along the oven with the guide car 15.

A coke guide of the type described, which moves laterally of the guide car 15 between guiding and traveling positions, is known as a "racking" guide. Some coke oven batteries use a "non-racking" guide, which does not move laterally of the guide car. A non-racking guide leaves an open space between the end of the oven and the walls and floor of the guide. This open space at the floor is commonly closed by a hinged plate, termed a "flopper plate," when an oven is being pushed. No attempt is made to close the space between the side walls of the guide and the oven. Consequently, a pushing operation with a non-racking guide results in a substantially greater spillage of coke than an operation with a racking guide.

The track 14 is provided with a pair of power supply rails 7b, 8b and a signal rail 20. The rails 7b, 8b, and 20 are connected through suitable trolleys and wires to a detector unit 21 mounted on the roof of the guide car. Power from the rails 7b and 8b is also supplied through suitable wires to a coke guide drive motor 22 and to the door machine 16, as well as to the propulsion motors of the guide car (not shown).

Mounted on the outer end of the guide 17 is a source 23 of radioactive material, shown in detail in FIGS. 3 to 5. The source 23 cooperates with the detector 10 on the pusher car 6 when the guide 17 is aligned with the pusher 12, and both the doors 4 have been removed from the oven between them.

Alongside the tracks 14 and at a lower level is another pair of tracks 24 along which moves a quench car 25 propelled by the quench car locomotive 26. Mounted on the roof of the quench car locomotive is another source 27 of radioactive material which cooperates with the detector 21 mounted on the guide car. The tracks 24 are provided with a pair of power rails 7c, 8c and with a signal rail 30. The rails 7c, 8c and 30 are connected through suitable trolleys and wires to a control unit 31 on the quench car locomotive, which is in turn connected through wires to a discharge door detector unit 32 mounted on the quench car. The power rails 7a and 8a, 7b and 8b and 7c and 8c are connected to common supply busses 7, 8, usually at 250 volts direct current. The signal rail 30 is shown as being connected through the winding of a relay 28 to the negative power supply line 8. Signal rail 20 is connected through contact 28a of relay 28 to the signal rail 9.

FIGS. 3 TO 6

These figures illustrate a source holder for radioactive material, which is shown somewhat diagrammatically at 23 in FIGS. 1 and 2. The source holder is mounted by means of four threaded stainless steel mounting rods 33 on the end of an outrigger frame 34 attached to the coke guide 17 (see FIG. 2). A source 35 (FIG. 4) of radioactive energy is received in a recess drilled in the end of a bolt 36 and is held in place in the recess by means of a set screw 37. A massive cylindrical block 38, preferably of steel, is provided with a vertical central bore 38a in which the bolt 36 is received. The block 38 is welded to upper and lower plates 39 and 40, through which the bolts 33 extend freely. Nuts 41 engage the upper and lower plates and fix the vertical position of the source holder. A nut 42 is welded on the outer side of the center of the upper plate 39 and threadedly receives a threaded portion of the shank of bolt 36. A sleeve 43 is rotatably mounted on one of the rods 33 between the plates 39 and 40. The sleeve 43 and its associated bolt 33 serve as a hinge for a shutter generally indicated at 44. The shutter 44 comprises a steel plate bent in an L shape so as to have a short leg 44a and a long leg 44b. The short leg 44a is welded at its end to the sleeve 43. The leg 44b extends horizontally in front of a bore 38b (FIG. 4) provided in the block 38. The bore 38b at its inner end communicates with the bore 38a which receives the source bolt 36. On the outer side of the block 38 and encircling the bore 38b is welded a nut 45. When the radioactive source is operating a small plug 46 (FIG. 4) of aluminum, or other material transparent to the radioactive rays from the source 35, is inserted in nut 45. The plug 46 is provided to keep dirt and other foreign materials out of the bore 38b. On the inner face of the plate 44b is welded a ring 47, which, when the shutter is closed, encircles the plug 46 and the bolt 45, with its inner end abutting against the block 38. On the outer side of the plate 44b is welded a steel block 48 having horizontal dimensions sufficient to block substantially all the radiation from the source 35 passing through the bore 38b. The shutter, comprising the plate 44, block 48 and ring 47 is shown in FIGS. 3, 4 and 5 in its closed position, with the radiation blocked. To open the shutter, it is rotated on its hinge 33, 43, to swing the cylindrical block out of alignment with the bore 38b.

During shipment of the source holder 23, the plug 46 is removed and replaced by a bolt 49 (see FIG. 5), having a shank which substantially completely fills the bore 38b and effectively blocks any radiation proceeding through that bore from the source 35. The source 35 is then substantially completely enclosed, regardless of any opening and closing of the shutter which may occur during transportation. The bolt 33 nearest the right-hand end of the shutter plate 44b, as viewed in FIG. 3, is encircled loosely by a sleeve 50 having welded thereon an arm 51 which projects forwardly as viewed in FIGS. 3 and 6 and extends through an opening 44c in the shutter plate 44b. Outside the shutter plate 44c the arm 51 is provided with a hole 51a to receive a padlock or other suitable fastening device for holding the shutter plate 44b in its closed position.

The locking procedure described above is commonly used only during shipment or storage of a source holder 23. After the source holder 23 is installed on a coke guide, the shutter may be locked closed for purpose of repair by the mechanism described below in connection with FIG. 7. The shipping bolt 49 shown in FIG. 5 is also used only during shipping or storage of the complete source holder 23. When the bolt 49 is used, then radiation from the source is effectively shielded, even if the shutter 44 is damaged or completely removed.

When the source holder 23 is mounted in the position shown in FIG. 2, it is approximately 25 feet above the ground level. Every coke oven battery is commonly provided with many elevated bridges or walkways (not shown in the drawing) which extend across the quench car tracks and approximately 10 feet above the level of the source holder. The source holder 23 and the mounting rods 33 may readily be installed from these overhead bridges. Because of the 10 foot spacing, special handling tools are required for the installation. These tools effectively keep the operating personnel at a safe distance from the radioactive material during all handling operations. It is not necessary to shut down the plant or even one oven for the loading or removal of the radioactive source. Furthermore, in case of emergency, the source can easily and safely be removed from the holder by unscrewing the bolt 36. Furthermore, even if vibration should loosen the screw connection of the bolt 36 in the nut 42, the bolt could not fall out of the vertical bore. There is thus a substantial advantage of safety in the construction shown.

The radioactive source material 35 may be any suitable radioactive isotope. Cobalt 60 and radium have been successfully used.

The threaded rods 33 also provide a convenient means for adjusting the height of the source holder to secure a maximum quantity of radiation at the pusher car. Many variables may affect this height adjustment, including the build-up of carbon on the top of the oven, the maintenance of the guide car tracks, etc. The provision of an effective and quick adjustment of the source height is highly desirable.

FIGS. 7 AND 8

These figures illustrate a mechanism for operating shutter 44 and the mounting of the source holder 23 on the coke guide 17. That portion of the outrigger 34 on the coke guide which supports the source holder 23 has been shown in dotted lines so as to better reveal the shutter 44 and its operating mechanism. The shutter plate 44b is provided with an extension 44d attached at its outer end by a pivot 52 to one end of an angle iron link 53. The opposite end of the link 53 is attached by a hinge pin 54 to a bracket plate 55 mounted on the guide car 15.

When it is desired to hold the shutter 44 closed, as for example, during repairs on the coke over or the guide car, the pin 54 may be removed and the link 53 swung to the dotted line position shown in FIG. 7, where the lower end of the link, as it appears in that picture, is held in place by a pin 56 received in a bracket 58 mounted on the coke guide 17. Link 53 is provided with holes 53a to receive the pin 56 when the link 53 is the dotted line position. When the apparatus is operating, the link 53 is connected by the pin 54 to the bracket 55, as shown in the full line position in FIG. 7.

The coke guide 17 is shown in its outer or traveling position in FIG. 7, and in its inner or guiding position in FIG. 8. As the coke guide moves from its traveling position to its guiding position, the shutter 44 pivots on its hinge, and the link 53 swings on its hinge pin 54, so that the shutter 44 is swung open, out of line with the beam of radiation, as illustrated in FIG. 8.

When the shutter 44 is open, the source 35 directs a beam of collinated radioactive rays along the path indicated at 29 in FIGS. 1 and 2. If the pusher car 6 is properly aligned, that beam will impinge on the Geiger tubes 61 in the detector 62.

FIGS. 9 TO 11

These figures show in detail the structure and the electrical circuits of the detector illustrated diagrammatically at 10 in FIGS. 1 and 2. FIG. 9 is a fragmentary view looking out through the window of the control cab on the pusher car 6 toward the coke oven battery 1. Above the window 57, on the inside of the wall 58 of the control cab, is mounted an indicator box 59. Depending from the bottom of the indicator box 59 is a cylindrical casing 60 which encloses a plurality of Geiger tubes 61 which constitute the sensitive parts of the detector unit, and other circuit elements associated with those tubes.

FIG. 10 illustrates the indicator box 59 and the casing 60 of FIG. 9 with the cover of the indicator box open and the cylinder 60 cut away to reveal the internal details.

The detector unit 62 inside the cylinder 60 is mounted on a frame consisting of a plurality of through bolts 63 which connect the top and bottom end plates 64. A plurality of spaced plates 65 are mounted on the through bolts 63 at intervals along the length of those bolts. The plates 65 and the bottom end plate 64 support some of the circuit elements, and others are attached to sheets 66 of insulating material fastened to the through bolts 63 by any suitable means. The Geiger tubes 61 are located between the two bottom sets of spacer plates 65.

The length of the detector unit 62 is selected so as to bring the Geiger tubes 61 to a locality just above the top of the pusher ram 12 (see FIG. 9). Although it is necessary to bring the Geiger tubes 61 into alignment with the radioactive beam which is passing as closely as possible over the top of the coke inside the oven, it is desired to extend the casing 60 and unit 62 downwardly no further than necessary, so as to minimize the obstruction to the view of the pusher car operator which is occasioned by the cylinder 60 located between the operator and the window 57.

The elements mounted on the frame 62 are connected by wires (for the most part omitted from FIG. 10) which extend through a plug connector 67 to the circuit elements inside the indicator box 59.

Mounted in the indicator box and visible from the outside thereof to the operator of the pusher car are a signal lamp 68 whose illumination indicates that the pusher is properly aligned with the guide on the coke side of the oven, a "power on" signal lamp 69, a "fuse blown" signal lamp 70, and a meter 71 which indicates the intensity of the radiation detected by the unit.

The cylinder 60 is provided on its outer surface near its upper end with a projecting flange 72 adapted to seat against a seating ring 73 which is welded or otherwise suitably fastened to the bottom of the indicator box 59. The seating ring 73 is externally threaded and is adapted to receive the internal thread on a retainer ring 74 having an inwardly projecting flange at its lower end adapted to engage and hold in place the flange 72 on the cylinder 60.

The cylinder 60 may be removed by first removing the retainer ring 74, without disturbing the elements on the frame 62 inside the cylinder 60. Furthermore, after the cylinder 60 has been removed, the entire detector unit 62 can be removed simply by separating the plug 67. In the event of failure of the detector unit for any reason, it can be readily and quickly replaced by a new detector unit with a minimum of interference with the operation of the pusher car. The units in the indicator box 59 are preferably also of plug-in construction, to facilitate repair and replacement.

FIG. 11 is a wiring diagram of the electrical control circuits for the pusher drive motor, the circuits in the indicator box 59, and in the detector unit 62. This figure also illustrates graphically the wave forms at certain points in the detector unit 62.

Referring to FIG. 11, there are shown power supply lines 75 and 76, which are connected by suitable means to the power supply lines 7 and 8 of FIG. 1. A motor 79 for driving the pusher 12 includes an armature 77 and a field winding 78. The motor windings are illustrated as for a D.C. series motor. It will be readily understood that shunt or compound motors may be used. A series motor is selected simply for purposes of illustration. The motor 79 is controlled by a forward push button 80 and a reverse push button 81. Push buttons are shown for the purpose of simplifying the diagram. It will be readily understood that other conventional controllers and starting boxes may be employed. Energization of the motor 79 is also controlled by a reversing relay 82 having contacts 82a and 82b and an interlocking relay 83 having a contact 83a. When the forward push button is depressed, a circuit is completed for energizing the reversing relay 82, and another circuit is completed for energizing the motor 79, but the latter circuit is completed only if the interlocking relay 83 is energized. The interlocking relay 83 may be energized by the circuits to be described below, in respose to the simultaneous occurrence of several related events, including the impingement of the beam 29 of radioactive rays on the Geiger tubes 61. Alternatively, the interlocking relay 83 may be energized by depressing a bypass push button 84.

The circuit for energizing the reversing relay 82 may be traced from positive power supply line 75 through push button 80, wire 85 and relay winding 82 to the negative power supply line 76. When push button 80 is depressed, the circuit just traced for energizing reversing relay 82 is completed, along with a circuit for energizing motor 79 in the forward or coke pushing direction. The circuit for motor 79 may be traced from positive power supply line 75 through push button 80, wire 86, armature 77 of motor 79, contact 83a of interlocking relay 83, contact 82b of relay 82, now closed on its upper stationary contact, wire 87, motor field winding 78, wire 88, contact 82a of relay 82, now closed on its upper stationary contact, thence to the negative power supply line 76. Note that in this circuit the right-hand terminal of the field winding 78 is connected to the negative power supply line.

When the reverse push button 81 is depressed, the circuit for reversing relay 82 is not completed. A circuit is completed for energizing motor 79 to drive the pusher in the reverse or retracting direction. This circuit does not require the energizing of interlocking relay 83. This circuit for motor 79 may be traced from power supply line 75 through push button 81, armature winding 77, wire 89, the contact 82a of relay 82, now closed on its lower stationary contact, wire 88, field winding 78, wire 87, contact 82b, now closed on its lower stationary contact and thence to the negative power supply line 76. Note that this circuit, the left-hand terminal of field winding 78 is connected to the negative power supply line 76, so that the motor 79 runs in the opposite direction from that produced by closure of the push button 80.

Three circuits (in addition to the emergency push button 84) are provided for energizing the interlocking relay 83. One of these circuits may be traced from positive power supply line 75 through wire 90, a switch 91 operated by a cam driven by motor 79, a contact 92a of a relay 92, wire 93, relay winding 83, and thence to the negative power supply line 76.

The switch 91 is closed when the pusher is in its retracted position and remains closed until the pusher moves forward to a position where it is abutting the coke face just inside an open oven. This circuit allows the operator to run the pusher forward to the coke face without waiting for energization of the signal rail 9 by the operators or apparatus on the coke side of the oven. The coke may thereby be prevented from spilling out the open door on the pusher side of the oven while waiting for preparations for the pushing operation to be completed on the coke side of the oven. If desired, the contact 92a may be omitted from the circuit just traced, the switch 91 being then directly connected to the wire 93. In that event, the pusher car operator does not have to wait for energization of relay 92 to move the pusher up to the coke face.

The second circuit for energizing interlocking relay 83 may be traced from signal rail 9 through a wire 148, contact 92b of relay 92, wire 93, relay winding 83 and thence to negative power supply line 76. This circuit, which is the one normally used for energizing relay 83, requires positive energization of signal rail 9 and energization of relay 92.

The third circuit for energizing relay 83 may be traced from signal rail 9 through a switch 95 movable between an open position shown in full lines in the drawing and marked by the legend "automatic" and a closed position shown in dotted lines in the drawing and marked with the legend "manual," and thence through wire 93 and winding 83 to negative power supply line 76. The switch 95 is normally kept in the automatic position shown, and is moved to the manual position only in the case of power failure or some other malfunction of the radiant energy detector 62, which would prevent relay 92 from being energized. When the switch 95 is in its manual position, the pusher may be driven forward whenever the signal rail is energized by the operators or apparatus on the coke side of the oven.

Relay 92 is a relatively heavy duty power relay and is controlled by a sensitive relay 94, whose energization is determined by the detector unit 62. The energizing circuit for relay 92 may be traced from positive power supply line 75 through one pole of a double pole switch 96, a fuse 97, detector unit power line 98, wire 99, the single contact of relay 94 and thence through the winding of relay 92 and the other pole of double pole switch 96 to the negative supply line 76.

The power relay 92, the manual-automatic switch 95, and the power control switch 96 may all be conveniently located in a single control unit 100, located separately from the indicator box 59 and the detector unit 62. The switch 96 is used to cut off power from the indicator box 59 and detector unit 62 whenever it is necessary to make repairs on those units. A current limiting resistor 107 is placed in the control unit 100 because of the possible high power dissipation by that resistor, which might overheat some of the elements in the box 59 on the detector unit 62.

The indicator box 59 includes the "pusher and guide aligned" signal 68, the "fuse blown" signal 70 and the "power on" signal 69, previously mentioned, together with the meter 71 and relay 94. The indicator box 59 also includes two diodes 101 and 102, a fuse 103, and current limiting resistors 104, 105 and 106. The indicator box 59 also includes a pair of Zener diodes 108, 109, connected in series.

The relay 92, its contacts, and the signal lamp 68 may each be regarded as a control element shiftable between an inactive condition (deenergization of winding of relay 92, open contacts, dark lamp) indicative that the alignment of the guides and the pusher with the oven has not been communicated to the control element (although that alignment may nevertheless exist) and an active condition (energization of relay 92, closed contacts, illuminated lamp) indicative that the alignment of the guides and the pusher has been communicated to the control element. Hence, the term "control element" as used in this specification is intended as a generic term inclusive of a member (e.g., contact 92a) movable between an inactive position and an active position and an electrical device (e.g., lamp 68) shiftable between an inactive deenergized condition and an active energized condition. In all cases, the inactive condition is readily and sharply distinguishable from the active condition, as is necessary for safety.

Diodes 101 and 102 are provided primarily to protect the detector from line transients. The provision of the diodes 101 and 102 and resistor 106 allow the circuit to be used on either a power supply at 250 volts D.C., as shown, or on 125 volts A.C., a common power supply voltage which may be encountered in some installations. While a 250 volt D.C. power supply is common in most steel mills and hence in coke oven batteries, the detector illustrated is useful in other control systems, where the more common 125 volt A.C. supply may be the only supply available.

The positive power supply line may be traced from wire 98 through diode 101, fuse 103, wire 110, and current limiting resistor 107 to a line 111 which extends to the detector unit 62. Similarly, the negative supply line may be traced from the left-hand pole of switch 96 through a wire 112, diode 102 and resistor 106 to a power supply line 113 which extends to the detector unit 62.

The Zener diodes 108 and 109 are connected in series between the lines 111 and 113 and regulate the potential supplied to the detector unit 62.

The "fuse blown" indicator lamp 70 is connected across the fuse 103 and is illuminated if the fuse 103 blows out. A capacitor 114 is connected between the power input side of fuse 103 and the wire 113 to bypass high frequency transients which may be picked up in the power lines. The "power on" indicator lamps 69 are connected in parallel and in series with the resistor 105 across the power supply lines to indicate positively that power is being supplied to the detector 62.

The "pusher aligned" signal lamp 68 is connected in a circuit which may be traced from the positive power supply line through resistor 104, lamp 68, contact 92c of relay 92 to the negative power supply line. The lamp 68 is energized whenever the relay 92 is energized.

Relay winding 94 is connected between the positive power line 111 and an output line 115, whose potential is controlled by the detector 62. Meter 71 is connected in series with a resistor 116 and the series group consisting of meter 71 and resistor 116 is connected in parallel with relay winding 94. A diode 116a is also connected in parallel with relay winding 94.

The detector unit 62 includes the Geiger tubes 61, shown as being five in number, although the particular number used is not critical. Also included in the detector unit 62 is a high voltage power supply circuit for the Geiger tubes. That circuit includes a transistor 117, a transformer 118 and a half-wave rectifier diode 119. The output signals from the Geiger tube 61 are supplied to a monostable multivibrator including transistors 120 and 121. The output of the multivibrator is fed to an integrating circuit including a diode 122 and a capacitor 123. The potential across the capacitor 123 of the integrating circuit is supplied to the input of a transistor 124 connected as an amplifier, whose output is supplied to the relay 94 and the meter 71 in parallel with that relay. Diode 116a protects transistor 124 from transients which might occur when relay 94 is energized.

The power supply circuit for the Geiger tubes 61 includes a resistor 125 having its right-hand terminal connected to the positive supply line 111 and its left-hand terminal connected through a wire 126 to a center tap on the primary winding of a transformer 118. The wire 126 is also connected through a resistor 127 to the base electrode of transistor 117. The emitter of transistor 117 is connected to line 113, which is in turn connected to ground through a bypass capacitor 128. Another high frequency bypass capacitor 129 is connected between the left-hand terminal of resistor 125 and the line 113. The lower terminal of the primary winding of transformer 118, as it appears in the drawing, is connected to the collector of transistor 117. The upper terminal of the primary winding is connected through a capacitor 130 to the base of transistor 117. The transistor 117 and its circuit connections function as an oscillator in a conventional manner, and supply alternating current to the primary winding of transformer 118. Transformer 118 is wound as a step-up transformer, and the high voltage obtained from its secondary winding. Current flows from the secondary winding through the diode 119, which acts as a half-wave rectifier, to a capacitor 131, which smooths the pulses due to the half-wave rectification. A resistor 132 and a voltage regulating diode 133 are connected in series across the capacitor 131. The power supply for the Geiger tubes is taken across the voltage regulating diode 133 through a resistor 134 connected to the anodes of the diodes and a relatively small resistor 135 connected between the cathodes of the diodes and the negative line 113. The resistor 134 may be, for example, 2.2 megohms and the resistor 135 may be 4700 ohms. The provision of this relatively small resistor in the cathode circuits of the Geiger tubes provides a sharply peaked output pulse across that resistor when one of the Geiger tubes breaks down. Such a sharply peaked pulse is illustrated at 136 in FIG. 11 as having a peak potential of 5 volts and a duration of 20 microseconds. The Geiger tubes are self-quenching, being preferably of the halogen quenched type.

The output signal from the Geiger tubes, appearing across resistor 135, is supplied to the input of the monostable multivibrator, whose circuit elements are so chosen that it will respond to a sharply peaked 20 microsecond input pulse by producing a square wave output pulse of about 2 milliseconds duration. The multivibrator circuit illustrated is conventional and any equivalent multivibrator circuit may be used in its place.

The collector of transistor 120 is connected through a resistor 137 to the positive supply line 111. The collector of transistor 120 is also connected to the base of that transistor through the resistor 138. The emitters of both transistors 120 and 121 are connected together and through a resistor 139 to the negative line 113. A diode 144a connects the line 113 to the base of transistor 120, to dissipate any reverse input pulse which may appear across resistor 135.

The collector of transistor 121 is connected to the positive line 111 through a resistor 140 and to the base of transistor 121 through a resistor 141. The base of transistor 121 is also connected through a capacitor 142 to the collector of transistor 120. The output signal of the multivibrator is taken from the collector of transistor 121 and is passed through a coupling capacitor 143 to the integrating circuit consisting of diode 122 and capacitor 123. A diode 144 is connected between negative line 113 and the common terminal of capacitor 143 and diode 122.

In the multivibrator, transistor 120 is normally OFF and the transistor 121 is normally ON. A positive input pulse applied to the base of transistor 120 turns it ON and charges capacitor 142, making its left-hand terminal positive. The charging of capacitor 142 applies a signal between the emitter and base of transistor 121 in a direction effective to cut that transistor OFF, thereby swinging its collector substantially to the potential of line 111 and transmitting a positive-going signal through capacitor 143 and diode 122 to the integrating capacitor 123. Diode 144 serves as a clamp on the signal transmitted through capacitor 143, and prevents that signal from swinging negative with respect to line 113. After capacitor 142 is once charged by an input pulse through transistor 120, the transistor 121 remains OFF until the charge on capacitor 142 has dissipated through resistors 140, 141 and 137. The capacitance of capacitor 142 may be made large with respect to the resistance of resistors 137, 140 and 141 to control the timing of the output pulses of the multivibrator, as desired. As shown, the multivibrator is designed to produce an output pulse of 2 milliseconds duration and approximately 8 volts amplitude in response to a single short duration peaked input pulse. Typically, when the Geiger tubes are aligned with a beam of radiation energy, the input pulses will arrive much more often than the 2 milliseconds duration established for the multivibrator output. Consequently, the capacitor 142 will be kept charged and the capacitor 123 will be kept charged. Even if the spacing of the input pulses is somewhat greater than 2 milliseconds, the integrating capacitor 123 holds its charge over a substantially longer interval.

A resistor 145 is connected across the integrating capacitor 123, and is provided with a movable tap, which is connected to the base of transistor 124. The emitter of transistor 124 is connected to negative line 113. The collector of transistor 113 is connected through a load resistor 146 to the detector unit output line 115 and thence to relay 94 and meter 71. A capacitor 147 is connected between the wire 115 and the base of transistor 124.

The transistor 124 amplifies the signal appearing across the capacitor 123. The gain is adjusted by moving the tap on resistor 145. Capacitor 147 introduces a certain delay in the output signal, since that capacitor must be charged before the output signal can go up to a potential large enough to energize relay 94. This delay is also useful, since the charge on capacitor 147 holds the relay 94 energized during minor interruptions in the energization of the integrating capacitor 123. During the pushing of the coke from the oven, coke may sometimes pile up ahead of the pusher ram sufficiently to interrupt the beam of radioactive energy. Such interruptions are not of long duration. The capacitor 147 keeps the relay 94 energized and the ram moving during such minor interruptions.

Summarizing the operation of the circuit of FIG. 11, the impingement of the beam of radioactive energy on the Geiger tubes 61 results in energization of relay 94, which in turn energizes relay 92 and (if signal rail 9 is energized) interlocking relay 83. As long as relay 83 is energized, the pusher car operator may actuate the push button 80 to close the motor 79 to drive the pusher in the forward or pushing direction. If the beam of radioactive energy is interrupted for a time determined by the characteristics of the detector circuit, then the relays 94, 92 and 83 are deenergized, effectively stopping the forward movement of the pusher.

The following table shows, by way of example, the identification of specific circuit elements which have been used in a particular embodiment of the invention that has been in successful operation. It should be understood that the invention is not limited to these particular circuit elements, or to any one of them.

TABLE I

| Circuit element: | Identification |
|---|---|
| Geiger tube 61 | Anton Type #313. |
| Diodes 101, 102 | Type 1N2071. |
| Fuse 103 | 3/16 amp. |
| Resistor 104 | 3.5K., 10 w. |
| Resistor 105 | 220K., 0.5 w. |
| Resistor 106 | 10 ohms, 1 w. |
| Resistor 107 | 3K., 25 w. |
| Zener diodes 108, 109 | Transitron Type #SV-915. |
| Capacitor 114 | 160 mf. |
| Resistor 116 | 560K., 0.5 w. |
| Transistor 117 | Type #2N497. |
| Transformer 118 | Philco #32-8905-2. |
| Diode 119 | Hughes 1N2382. |
| Transistor 120, 121 | Type #2N332. |
| Diode 122 | Type #1N2071. |
| Capacitor 123 | 100 mf. |
| Transistor 124 | Type #2N335. |
| Resistor 125 | 680 ohms, 1 w. |
| Resistor 127 | 22K., 0.5 w. |
| Capacitor 128 | 0.5 mf., 200 v. D.C. |
| Capacitor 129 | 1 mf., 35 v. |
| Capacitor 130 | .05 mf. |
| Capacitor 131 | .0015 mf., 3Kv. |
| Resistor 132 | 5.1M, 0.5 w. |
| Diode 133 | Anton Type #414. |
| Resistor 134 | 2.2M, 0.5 w. |
| Resistor 135 | 4700 ohms, 0.5 w. |
| Resistor 137 | 5.1K., 0.5 w. |
| Resistor 138 | 27K., 0.5 w. |
| Resistor 139 | 1K., 0.5 w. |
| Resistor 140 | 51K., 0.5 w. |
| Resistor 141 | 18K, 0.5 w. |
| Capacitor 142 | 0.5 mf. |
| Capacitor 143 | 1.5 mf. |
| Diodes 144, 144a | 1N2071. |
| Resistor 145 | 25K., 1 w. |
| Resistor 146 | 270 ohms, 0.5 w. |
| Capacitor 147 | 10 mf., 35 v. |

In the Geiger tube circuit just described, it should be noted that the circuit is arranged to provide a relatively small amplitude (5 volts), short duration (20 microseconds) pulse when one of the Geiger tubes breaks down. This pulse is taken across a relatively low resistance in series with the cathodes of the Geiger tubes. The Geiger tubes are operated at a voltage (1000–1200 volts) somewhat greater than is conventional, in order that the output pulse across resistor 135 may have amplitude sufficient to trip the monostable multivibrator. Halogen quenched Geiger tubes are preferable because they are not damaged by operation at these higher voltages. By the use of this short duration output pulse from the Geiger tubes, the resolving time of the Geiger tube system is greatly improved, i.e., shortened, as compared to conventional Geiger tube circuits. This shorter resolving time permits operation of a large number of Geiger tubes in parallel without an appreciable loss in counting accuracy. This is a distinct advantage at high counting rates.

The monostable multivibrator produces a square wave output pulse which does not require additional pulse shaping stages. The circuit constants are chosen to provide a maximum output voltage across the capacitor 123 of the integrating circuit in response to a relatively small number of pulses generated by the Geiger tube. This is accomplished by adjusting the ON time of the monostable multivibrator to make its output pulses long as compared with the short duration input pulses. After this relatively small threshold pulse rate is reached, further increases in the incident radiation do not result in any changes in the integrator output potential. By virtue of this arrangement, the circuit provides an output control potential to the relay 94 which is substantially constant and nearly independent of many variable factors such as reduced radiation due to decay of the source or minor obstructions in the oven. This makes the apparatus very stable and eliminates the need for sensitivity adjustments.

The arrangement just described is of particular advantage in any situation where it is desired to have Geiger tubes turn a circuit on in response to the presence of radioactive rays and turn it off in the absence of those rays. Such an on-off control in response to the presence or absence of radioactive rays is useful in many different control problems.

FIGS. 12, 13 AND 14

These figures illustrate the source holder 27 which is mounted on the quench car locomotive. The holder includes three threaded rods 150 which may be fastened to the roof of the locomotive cab by any suitable means. An upper plate 151 and a base plate 152 are slidably mounted on the bolts 150. Nuts 153 engage the bolts 150 below the base plate 152. Similarly, nuts 154 on the bolts 150 above the upper plate 151 hold it against upward movement. The lower plate 152 has on its upper surface an upwardly projecting annular flange 155, whose uppermost edge is beveled, as shown at 155a. The upper plate 151 has projecting downwardly from its under surface a similar flange 156, whose lower surface is beveled as shown at 156a. A sphere 157, preferably of steel, is clamped between the beveled surfaces 155a and 156a by tightening the nuts 153 and 154. The sphere 157 is provided with a diametrical bore 157a. Internally threaded nuts 158 and 159 are welded to the surface of the sphere 157 and encircle the opposite ends of the bore 157a.

It is presently preferred to mount the holder 27 on the cab of the quench car locomotive by welding a channel iron to the roof of the cab so that it extends forward of the cab for about five or six feet. The base plate 152 is then welded to the channel iron near its outer end. This permits the operator in the cab to inspect the source and also keeps the operator and other personnel at a distance from the source.

The nut 158 threadedly receives a bolt 160 having a threaded shank 160a adapted to cooperate with nut 158. The bolt 160 has a hexagonal head 160b and is provided with a projecting ring 161 at the center of the head to receive the end of a chain 162. The other end of the chain is welded to the plate 151. The chain serves as a safety retainer to hold the source bolt 160 in case it should become loosened and fall out of the nut 158. The inner end of the bolt 160 is provided with a recess 160c to receive a source of radioactive rays. The recess 160c is threaded to receive a retainer screw 160d after the radioactive material is inserted. A plug 163 is threaded into the nut 159. This plug serves the same function as the plug 46 in the source holder of FIGS. 3 and 4. During shipment of the source holder plug 46 may be replaced by a shipping bolt similar to the bolt 49 of FIG. 5.

It may be seen that by loosening the nuts 154, the sphere 157 becomes capable of universal rotation on the flanges 155 and 156, so that the bore 157a, and particularly the end thereof containing the plug 163, may be aimed in any desired direction. In the apparatus of FIGS. 1 and 2, it is necessary that the sphere 127 be rotated so that the bore 157a points to one side of the quench car locomotive, as may be seen in FIG. 1, and upwardly at an angle of about 45°, as may be seen in FIG. 2. The path transversed by the beam of radioactive rays from the source is illustrated at 164 in FIGS. 1 and 2.

FIG. 15

The detector unit 21 shown diagrammatically in FIGS. 1 and 2 and mounted on the guide car roof is illustrated in the wiring diagram of FIG. 15. The detector unit 21 is electrically very similar to the detector unit 62 of FIG. 11. Corresponding elements used in the two units have been given the same reference characters in FIG. 15 that they had in FIG. 11, and will not be further described. The only difference between the detector unit 62 of FIG. 11 and the corresponding components of detector unit 21 of FIG. 15 are the omission of resistor 146 from unit 21 to provide a faster response by the relay 94, and the changing of capacitor 147 from 10 mf. in FIG. 11 to 1 mf. in FIG. 15, for the same purpose.

The shape of the casing in which the detector unit 21 is mounted is not critical. Typically it will be in a casing with rectangular sides rather than a cylindrical casing such as shown at 60 in FIGS. 9 and 10. The Geiger tubes 61 may be greater in number than those in the detector unit 62. Preferably they should be arrayed along a line parallel to the direction of movement of the quench car locomotive and with due regard to the spread of the beam of radiation after it leaves its source so that the detector unit Geiger tubes will be impinged on by radiation if the quench car locomotive is within a distance of plus or minus one foot from a given position along the track 24.

The detector unit 21 on the coke guide car 15 includes circuit elements corresponding to all those included in the detector unit 62 of FIGS. 9 and 11 and in its associated indicator box 59. The detector unit 21 is connected to a control unit 165 (FIG. 15). The control unit 165 may be located inside the cab of the coke guide car.

The contact of relay 94 controls an energizing circuit for a relay 166, located in the control unit 165. This circuit may be traced from the positive power supply line 18 through one pole of a manually operable switch 167 and thence through wires 168 and 169, the contact of relay 94, wire 170, the winding of relay 166 and thence through fuse 171 and the other pole of switch 167 to the negative power supply line 19.

Relay 166 operates a contact 166a which controls an energizing circuit for a signal lamp 172. This energizing circuit may be traced from wire 168 through a wire 173, contact 166a, lamp 172, fuse 171 and switch 167 to the negative power line 19.

Relay 166 also controls, through a time delay mechanism schematically indicated at 174, a contact 166b connected to the circuit for energizing a repeater relay 175. This circuit may be traced from wire 168 through a switch 176, a normally closed manual switch 177, a single pole-double throw switch 178, the contact 166b, the winding of relay 175 and thence to the negative power supply line 19. A cam 176a driven by the motor which moves the coke guide 17 prevents movement of switch 176 to its closed position unless the guide is in its guiding position. When the cam 176a permits, switch 176 may be manually closed. Alternatively, the cam 176a may operate the switch 176, in which case the cam may be so constructed that the switch 176 is closed only when coke guide 17 is against the face of the oven. The switch 178 is normally in its left-hand or automatic position as shown in the drawing.

The relay 175 operates a contact 175a which controls an obvious circuit for energizing a signal lamp 179, which is conveniently placed alongside the signal lamp 172. Relay 175 also controls a contact 175b. When relay 175 is energized, contact 175b closes, connecting the positive power supply potential to the signal rail 20. Relay 175 also controls a contact 175c. When relay 175 is energized, contact 175c closes, completing a holding circuit for relay 166. This circuit may be traced from wire 168 through wire 173, contact 175c and the winding of relay 166 to the negative supply line.

The signal lamps 172 and 179 are preferably located, as shown in FIG. 1, outside the cab of the coke guide car 15 in the position where they are readily visible to the operator of the quench car locomotive 26.

Operation of FIG. 15

After the guide car 15 is aligned with an oven, the quench car locomotive operator may then drive his locomotive so as to bring the quench car 25 into alignment with the coke guide 17. When the condition of alignment is reached, the source of radioactive material in the source holder 27 directs its beam at the detector 21 on the guide car, which responds by energizing relay 166 and lights the signal lamp 172. The lighting of the signal lamp 172 informs the quench car locomotive operator that the quench car is in the proper position to receive coke from the coke guide. Since the quench car is moving when the beam impinges on the detector 21, and the signal lamp remains lit only during a travel of about two feet (plus or minus one foot from a given position), the detector must act rapidly to give the operator time to stop the car after he sees the signal light up, and before the car overshoots the two foot range. It is because of this necessity for fast action that resistor 146 is omitted from detector 21. In some cases, it may be desirable to omit or modify the capacitance of the capacitor 147 also, to further speed the operation of the relay 94.

The signal rail 20 is not energized until the quench car has remained in that position for a time determined by the characteristics of time delay mechanism 174 and also is not energized until the coke guide 17 has moved into its guiding position, thereby closing the switch 176.

The time delay mechanism 174 protects against unintentional energization of the signal rail 20 which might otherwise occur when the quench car was being driven past the location of the guide car 15, without any intention on the part of the quench car locomotive operator to stop the quench car in alignment with the guide car. The time delay insures that the quench car is actually stopped in alignment with the coke guide, and is not merely passing. As soon as the time delay has passed, the signal 179 is illuminated, telling the quench car locomotive operator that the signal rail 20 has been energized and that the relay 166 is locked in, and its energization is no longer dependent on the maintenance of the quench car locomotive in its aligned position. The quench car locomotive normally moves during the pushing of coke from the oven, so as to distribute the load of coke along the length of the quench car. The lighting of the signal lamp 179 informs the quench car operator that he is free to proceed with such movement of the quench car as may be required during the pushing operation.

After the pushing operation is completed, the movement of the coke guide away from the oven opens the switch 176, deenergizing relay 175 and opening the holding circuit for relay 166, so that the circuit is reset and ready to respond to a new energization of relay 94.

Where the interlocking system described is used with a non-racking coke guide, there is, of course, no movement of the guide available to actuate the switch 176. In that situation, the reset switch may be operated manually. An alternative is to actuate the switch to its open position when the flopper plate is retracted. Another alternative is to open the switch whenever the traction motor of the guide car is energized. Still other operating functions may be chosen to trip the reset switch, as long as the function which trips it is one which occurs after each pushing of an oven.

The use of a non-racking coke guide also requires some mechanism other than that of FIGS. 7 and 8 for opening the shutter 44. The shutter 44 may be manually controlled by the guide car operator, or it may be operated by a linkage connected to the flopper plate.

In case of a power failure or other malfunctioning in the detector unit 21, the switch 178 can be thrown to the manual position, so that switch 177 is directly connected to the signal rail 20. When switch 178 is in the manual position, the supply of power to the signal rail 20 is manually controlled by switch 177, which may be operated by the operator in the coke guide car 15.

The switch 167 is provided to deenergize the indicator box 59 and the detector unit 21, in case it is required to repair these units.

FIG. 16

This figure illustrates circuits for the control unit 31 and the discharge door detector 32, both shown diagrammatically in FIG. 1. The discharge door detector 32 comprises a switch operated by an armature 180 which acts in cooperation with the two permanent magnets 181 and 182. The magnets 181 and 182 act in opposition to each other on the armature 180 and the structure is unbalanced, so that when the fields of the two magnets are symmetrical, the magnet 182 overcomes the magnet 181 and attracts the armature, thereby opening the switch as shown in FIG. 16. A part of the quench car discharge door mechanism is shown diagrammatically at 183. This part is necessarily of steel. When the door is open, the part 183 is spaced from the detector 32 so that the armature 180 remains in its full line position. When the discharge door is closed, the part 183 moves close to the magnet 182 and provides a magnetic short circuit for a portion of the flux of that magnet. Magnet 181 is then effective to move the armature 180 to the dotted line position shown in FIG. 16, closing the electrical circuit through the armature. That circuit energizes the winding of a relay 184 having contacts 184a and 184b. Contact 184b completes an obvious circuit for energizing a signal lamp 185, which may be located in the cab of the quench car locomotive 26. Contact 184a completes a circuit for connecting the positive potential from positive supply line 7c to the signal rail 30, if a manually operable switch 186 is first closed. Another manually operable switch 187 is provided to shunt the contact 184a in the event that it is desired to put power on the signal rail 30 under manual control. The switch 187 may be used, for example, in case the discharge door detector 32 becomes inoperative.

As shown in FIG. 1, the signal rail 30 is connected to the winding of a relay 28 whose opposite terminal is connected to the negative power supply line 8. Consequently, the relay winding 28 is energized whenever power is supplied to the signal rail 30, thereby closing the associated contact 28a. When contact 28a closes, the signal rail 20 of the guide car is connected to the signal rail 9 of the pusher car. If the signal rail 20 then has positive potential supplied to it, as determined by the circuits of FIG. 15, then that positive potential is also supplied to the signal rail 9 and hence to the interlocking relay 83 of FIG. 1, thereby enabling the pusher car operator to actuate the motor 79 to drive the pusher in the forward direction.

FIGS. 1, 11, 15 and 16 thus disclose an interlocking system which prevents the pusher from being driven in the forward direction unless the following conditions are met:

(1) Pusher and coke guide aligned with opposite sides of same oven, with both doors open (sensed by detector 62);

(2) Coke guide 17 against oven (determined by opening of shutter 44b as in FIG. 8, and also by closure of switch 176 in FIG. 15);

(3) Alignment of quench car with guide car (determined by detector 21 of FIG. 15);

(4) Quench car discharge doors closed (determined by detector 32 of FIG. 16; note that this detector also effectively determines that a quench car is present—the detector 21 might be actuated by a locomotive having no quench car coupled to it.

The relay 83 and its contact 83a may each be regarded as a control element shiftable between an inactive condition (deenergization of the relay winding, contact 83a open) indicative that the alignment of the coke guide, the quench car and the pusher with a particular oven and closure of the quench car discharge door have not been communicated to that control element (although that alignment and closure may nevertheless exist) and an active condition (energization of relay 83, closed contact 83a) indicative that the alignment of the coke guide, the pusher, and the quench car, and the closure of the quench car door have been communicated to that control element.

Some coke oven batteries do not have signal rails, such as the rails 9, 20 and 30 of FIG. 1. In such a battery an interlocking arrangement equivalent to that of FIG. 1 may be provided by modifying the apparatus of FIG. 1 in the following respects: (a) Place a solenoid operated shutter on the quench car locomotive source 27 and energize the solenoid by a circuit similar to that of FIG. 16, which energizes signal rail 30 in response to closure of the quench car discharge doors; (b) Use a solenoid to actuate the shutter on the source 23 and energize it from the circuits used to energize rail 20 in FIG. 15. If a racking type coke guide is used, this shutter must be electrically or mechanically interlocked with the guide so that the shutter is opened only when the guide is racked in. For example, the circuit for energizing the guide racking motor to drive the guide to its guiding position may be controlled by a relay contact closed only when the circuit corresponding to rail 20 of FIG. 15 by energized. The shutter operating mechanism would be otherwise the same as shown in FIGS. 6 to 8. The pusher controls would be modified to connect signal rail 9 of FIG. 11 direct to the positive supply line 75. Such an arrangement would interlock the quench car doors, the coke guides, and the pusher without the use of a signal rail system.

Another alternative but equivalent interlocking arrangement would be to place the source 27 of FIG. 1 on the guide car 15 and to place the detector 21 and its associated signal lamps 172 and 179 on the quench car locomotive. The control unit 31 and the detector 21 should then be electrically or mechanically interlocked on the quench car locomotive. For example, this might be accomplished by moving the relay 28 to the quench car locomotive and connecting the signal rail 30 to the stationary contact of that relay and to the signal rail 9.

FIG. 17

This figure illustrates a modified form of quench car discharge door detector system, which may be used where the quench car has two doors rather than one, and which also makes provision for an arrangement where the quench car is not provided with a signal rail. In this arrangement, the two doors of the quench car are provided with separate door detectors 32a and 32b, similar in every way to detector 32 of FIG. 16. Detector 32a controls an obvious circuit through a signal lamp 188 and a resistor 189. Detector 32b completes a similar circuit through a signal lamp 190 and a resistor 191.

A relay 192 has its winding connected in a series circuit with a normally closed "stop" push button 193, a normally open "start" push button 194 and the contact of detector 32a. Relay 192 has a holding contact 192a which shunts the push button 194. Relay 192 also controls a contact 192b connected in series with a solenoid 195 and also in series with the contact of detector 132b. Solenoid 195 operates a linkage for opening a shutter 196 associated with the radioactive source 27 on the quench car, shown diagramatically in FIG. 17.

When both the doors of the quench car are closed, the lamps 188 and 190 are both illuminated. The quench car locomotive operator may push the button 194 for relay 192 and contact 192a then closes the holding circuit for relay 192 so that that relay remains energized after the operator releases the button 194. Relay 192 also closes the contact 192b energizing the solenoid 195 and opening the shutter 196, so that the detector 21 on the guide car may detect the presence of the quench car in its intended location. If either of the detectors 32a and 32b has its circuit open, then the solenoid 195 is deenergized. Detector 32b has its contacts directly in series with the solenoid 195. Detector 32a has its contacts in series with relay winding 192 which must be energized to maintain the solenoid 195 energized. It may be seen that the circuit of FIG. 17 interlocks the same essential elements as the circuit of FIG. 16. In this case, the interlocking of the quench car discharge doors is communicated through the radioactive source 27, by means of the shutter 196. When the arrangement of FIG. 17 is used, the relay 28 is not employed, and the signal rail 20 is connected directly to the signal rail 9.

It should be recognized that it is not necessary to the broader aspects of the invention that both the quench car discharge door detection apparatus and the quench car disposition detector apparatus be used in the same interlocking system. Either of these two apparatuses has substantial utility independently of the other, although they also provide substantial advantages when used in combination.

FIGS. 18 TO 21

These figures illustrate the mounting of the quench car discharge door detectors such as the detectors 32 of FIG. 16, or the detectors 32a and 32b of FIG. 17.

As best seen in FIGS. 18 and 20, the quench car is a hopper car having a hopper bottom 210 which slants downwardly to one side. At the lower side of the hopper bottom 210, the side wall 211 of the car is provided with a discharge door generally indicated at 212. The discharge door 212 consists of a plurality of panels hinged at the top, and connected together by an angle beam 213. The discharge door is moved between the closed position shown in FIG. 20 and the open position shown in FIG. 21 by a suitable pneumatic or electrical motor (not shown).

The hopper bottom 210 extends under the discharge door and projects to the side, forming an apron 214 for carrying the coke out beyond the trucks of the quench car to a drying dock (not shown). At the ends of the quench car, guide plates 215 are provided to keep the coke at the ends of the car from spilling endwise when the discharge door is open.

The quench car door detector switch 32 is mounted at the end of the car, on a convenient part of the car frame where it will not be subject to contact by the hot coke. An extension arm 216 is attached as by riveting or welding to the angle beam 213 and extends beyond the guide plate 215 at the end of the car. Beyond the guide plate 215, the arm 216 is bent at right angles inwardly parallel to the end of the car. At its end, the arm 216 carries an armature 183 which cooperates with the detector switch 32. When the discharge door 212 is open, the armature 183 is spaced a substantial distance from the detector 32, being then in the position shown in FIG. 21 and diagrammatically in full lines in FIGS. 16 and 17. When the discharge door 212 is closed, the armature 183 moves in close proximity to the detector 32, to the position shown in FIG. 20 and diagrammatically in dotted lines in FIGS. 16 and 17. As best seen in FIGS. 20 and 21, the guide plate 215 may be cut away to permit free passage of arm 216.

FIG. 22

This figure is similar to FIG. 2, and diagrammatically illustrates a somewhat different layout of the detector apparatus from that employed in FIG. 2. In this case, each oven is provided with a pusher car detector 201. The several detectors 201 cooperate with a single radioactive source 202 mounted on the pusher car. Similarly, each oven is provided with a quench car detector 203 cooperating with a source 204 mounted on the quench car 25. Alternatively, it could be mounted on locomotive 26, providing each detector 203 were offset laterally from the oven it protects by a distance equal to the spacing between the quench car and its locomotive. Another source 207 mounted on the guide car cooperates with a detector 208 mounted on the quench car locomotive. Alternatively, the detector 208 could be mounted on the quench car, provided it is adequately protected from the hot coke. The circuit in the pusher car may control the pusher motor in a manner generally similar to the circuits described in detail above. For example, the detector 208 may, upon impingement of a beam from source 207, open a shutter or otherwise release a beam of rays from source 204 directed toward one of the detectors 203. When the detector 203 and the detector 201 on the same oven are both actuated, then a signal is supplied through a signal rail to the pusher car cab. The release of the beam from source 204 may also be made dependent upon closure of the quench car discharge doors as described in FIGS. 16 and 17. The source 207 on the guide car should have a shutter interlocked with the coke guide so that the shutter is opened only when the guide is in its guiding position. Since the guide can move to its guiding position only after the oven door is removed, the opening of the shutter checks that the oven door on the coke side of the battery is open. The arrangement is such that a signal is supplied to the pusher car cab only when the pusher car, the quench car and the guide car are all aligned with the same oven, and the door on the coke side oven is open. This signal may be supplied through signal rails and relays in the same manner as outlined in detail above. The arrangement shown in FIG. 22 requires somewhat more equipment, particularly the plurality of detectors 201 and 203, one for each oven, but has the advantage that it does not require the successful transmission of a beam of radioactive rays through the top of the oven, where it may be blocked by the coke being pushed, carbon deposits on the oven roof, etc.

The apparatus illustrated in FIG. 18 may be further modified to eliminate the need for a signal rail by mounting a single detector 201 on the pusher car in the location shown for source 202, and mounting a plurality of sources 202 on the fixed parts of the oven, in the location shown for detectors 201. Each detector 203 would then control a shutter on the source 202 of its associated oven. When the pusher car is properly positioned, then the detector 201 signals the pusher car operator and permits energization of the motor circuit for driving the pusher ram forward. Again, the apparatus checks that the pusher car, quench car, and guide car are aligned, and the door on the coke side of the oven is open. The door on the pusher side is, of course, under the direct observation of the pusher car operator, and there is no need for an automatic interlock of that door. Furthermore, if the operator should erroneously move the ram forward befoe removing the door on the pusher side, the door would stop the ram.

While we have shown and described certain preferred embodiments of our invention, other modifications thereof will readily occur to thise skilled in the art, and we therefore intend our invention to be defined only by the appended claims.

We claim:
1. Interlocking control apparatus for a coke oven battery, comprising:
   (a) a pusher car movable along one side of the battery;
   (b) a pusher on the pusher car movable into an oven to expel coke therefrom on the opposite side of the battery from the pusher car;
   (c) a coke guide car movable along said opposite side of the battery;
   (d) a coke guide on the guide car;
   (e) quench car means including a quench car adapted to receive hot coke and movable along a path alongside the path of the coke guide car and on the opposite side thereof from the battery;
   (f) a discharge door on said quench car, said door being openable to discharge coke therefrom;

(g) interlocking means responsive to the discharge door only in its closed position, and to alignment of the pusher, the coke guide and the quench car with the same oven, and effective to inhibit movement of the pusher into an oven until:
  (1) the pusher and the coke guide are aligned with that oven;
  (2) the quench car is aligned with the coke guide; and
  (3) the discharge door on the quench car is closed.

2. Interlocking control apparatus for a coke oven battery, comprising:
(a) a pusher car movable along one side of the battery;
(b) a pusher on the pusher car movable into an oven to expel coke therefrom on the opposite side of the battery from the pusher car;
(c) a coke guide car movable along said opposite side of the battery;
(d) a coke guide on the guide car;
(e) a quench car adapted to receive hot coke and movable along a path alongside the path of the coke guide car and on the opposite side thereof from the battery;
(f) a locomotive for the quench car;
(g) interlocking means responsive to alignment of the pusher, the coke guide and the quench car with the same oven comprising:
  (1) a first source of radioactive rays on the pusher car and directed toward the battery;
  (2) a first plurality of detectors of said rays, one for each oven, located on the pusher side of the oven, each said detector being impinged by rays from said first source when the pusher is aligned with its associated oven;
  (3) a second source of radioactive rays on the quench car locomotive;
  (4) a second plurality of detectors of said rays, one for each oven, located on the coke side of the oven, each said detector of said second plurality being impinged by rays from said second source when the quench car is aligned with its associated oven;
  (5) means for indicating alignment of the coke guide car and the quench car including:
    (aa) a third source of radioactive rays mounted on one of said two last-mentioned cars;
    (ab) a third detector for said rays mounted on the other of said two last-mentioned cars;
  (6) a control element shiftable between an inactive condition indicative that alignment of the coke guide, the quench car and the pusher has not been communicated to the element and an active condition indicative that the coke guide, the quench car and the pusher are aligned, said control element being effective only in its inactive condition to inhibit movement of the pusher into an oven;
  (7) means actuated only when said third detector is impinged by rays from said third source, and the detectors in said first and second pluralities of detectors which are associated with one oven are both impinged by rays from said first and second sources, to operate said control element to its active condition.

3. Interlocking control apparatus for a coke oven battery, comprising:
(a) a pusher car movable along one side of the battery;
(b) a pusher on the pusher car;
(c) motor means for driving the pusher between a retracted position spaced from the oven through a holding position wherein the pusher is aligned with the oven door opening and is effective to retain the coke in the oven while the door is open and thence into an oven to expel coke therefrom on the opposite side of the battery from the pusher car;
(d) a coke guide car movable along the opposite side of the battery;
(e) a coke guide on the guide car;
(f) interlocking means responsive to alignment of the pusher and coke guide on opposite sides of the same oven; and
(g) control means for the motor means including:
  (1) means operable whenever the pusher is in its retracted position to actuate the motor means to drive the pusher from its retracted position to its holding position only; and
  (2) means including said interlocking means and operable only when the pusher and coke guide are both aligned with the same oven to actuate the motor means to drive the pusher beyond the holding position and into that oven.

4. Interlocking apparatus for a coke oven battery, comprising:
(a) a pusher car movable along one side of the battery;
(b) a pusher on the pusher car movable into an oven to expel coke therefrom on the opposite side of the battery from the pusher car;
(c) a coke guide car movable along said opposite side of the battery;
(d) a coke guide movable bodily transversely of the guide car between a traveling position wherein the coke guide is spaced from the battery and a coke guiding position wherein the coke guide abuts the battery and guides the movement of coke expelled by the pusher; and
(e) interlocking means responsive to the positions of the pusher, the coke guide car and the coke guide and effective to inhibit movement of the pusher into an oven until the pusher and the coke guide are aligned with that oven and the guide is in its guiding position;
(f) said interlocking means including:
  (1) a control element shiftable between an inactive condition indicative that the alignment of the coke guide and the pusher has not been communicated to the element and an active condition indicative that the pusher and guide car are aligned with the same oven and the coke guide is in its guiding position;
  (2) source means mounted on the coke guide for producing a collimated beam of radioactive rays directed through the top of the oven toward the pusher car;
  (3) a detector sensitive to said rays mounted on the pusher car;
  (4) a shutter on said source means operable between a closed position in which the beam is blocked and an open position;
  (5) and a linkage connecting the shutter to a fulcrum on the guide car which does not move when the coke guide moves between its guiding position and its traveling position, said linkage being effective to operate the shutter to its open position when the coke guide moves to its guiding position and to operate the shutter to its closed position when the coke guide moves to its traveling position.

5. Interlocking apparatus as defined in claim 4, including lockout means comprising a lockout element on said coke guide and a link in said linkage shiftable from an operating position in which it engages said fulcrum to a lockout position in which it engages said lockout element, so that the shutter is not then opened by movement of the coke guide.

6. Interlocking control apparatus for a coke oven battery, comprising:
(a) a pusher car movable along one side of the battery;
(b) a pusher on the pusher car movable into an oven to expel coke therefrom on the opposite side of the battery from the pusher car;
(c) a coke guide car movable along said opposite side of the battery;
(d) a coke guide on the guide car;
(e) a quench car adapted to receive hot coke and movable along a path alongside the path of the coke guide car and on the opposite side thereof from the battery;
(f) interlocking means responsive to alignment of the pusher, the coke guide and the quench car with the same oven, and effective to inhibit movement of the pusher into an oven until:
 (1) the pusher and the coke guide are aligned with that oven; and
 (2) the quench car has been aligned with the coke guide for a predetermined time;
(g) said interlocking means including:
 (1) a control element shiftable between an inactive condition indicative that alignment of the coke guide and the pusher has not been communicated to the element and an active condition indicative that the coke guide and the pusher are aligned, said control element being effective only in its inactive condition to inhibit movement of the pusher into an oven;
 (2) means, including time delay means, responsive to alignment of the quench car and the guide car and effective to prevent operation of the pusher into an oven until the coke guide and the quench car have been aligned for a predetermined time sufficiently long to indicate that the quench car has stopped in alignment with the coke guide; and
 (3) said means responsive to alignment of the quench car and the guide car including:
  (i) first signal means actuated immediately upon alignment of the quench car and the coke guide; and
  (ii) second signal means actuated after the quench car and the coke guide have been in alignment for said predetermined time.

7. Interlocking control apparatus for a coke oven battery, comprising:
(a) a coke guide car movable along the coke discharge side of the battery;
(b) a coke guide on the guide car;
(c) a quench car adapted to receive hot coke and movable along a path alongside the path of the coke guide car and on the opposite side thereof from the battery;
(d) means, including time delay means, responsive to alignment of the coke guide and the quench car with the same oven, and effective to exhibit an unsafe signal until the quench car has been aligned with the coke guide for a predetermined time sufficiently long to indicate that the quench car has stopped in alignment with the coke guide;
(e) a pusher movable into an oven from the side opposite the coke guide and the quench car to expel coke from the oven through the guide into the quench car;
(f) a motor for driving the pusher;
(g) control means for said motor;
(h) a locomotive for driving the quench car and operable to drive the car during pushing of the coke by the pusher, so as to spread the coke along the quench car;
(i) a control element movable from a safe position to an active position by said time delay means upon expiration of said predetermined time;
(j) holding means effective to maintain said control element in its active position regardless of subsequent movement of the quench car; and
(k) means connecting the control element in the motor control means, said motor control means being effective only when the control element is in its active position, to permit operation of the pusher in the coke pushing direction.

8. Interlocking control apparatus as defined in claim 7, including means operable after completion of the pushing of an oven to reset the control element to its safe position.

9. Interlocking control apparatus as defined in claim 8, including a coke guide car movable along said coke discharge side of the battery, a coke guide on the coke guide car movable between a traveling position spaced from the battery and a guiding position abutting the battery, motor means for driving the coke guide between its positions, and means effective when the last-mentioned motor means actuates the coke guide to its traveling position to operate the reset means for the second control element.

References Cited by the Examiner

UNITED STATES PATENTS

| | | | |
|---|---|---|---|
| 1,025,815 | 5/1912 | Lepley | 202—262 |
| 1,818,567 | 8/1931 | McIntire | 202—262 |
| 2,252,807 | 8/1941 | Haberle et al. | 214—23 |
| 2,421,944 | 6/1947 | Hughes | 214—23 |
| 2,589,266 | 3/1952 | Lavely | 214—23 |
| 2,904,692 | 9/1959 | Gscheidlen | 250—105 |
| 2,932,744 | 4/1960 | Lehman | 250—105 |
| 3,012,147 | 12/1961 | Hermsen et al. | 250—83.6 |
| 3,017,622 | 1/1962 | Horsfall | 340—282 |
| 3,031,577 | 4/1962 | Garbellano | 250—83.6 |

FOREIGN PATENTS

| | | |
|---|---|---|
| 801,116 | 9/1958 | Great Britain. |
| 801,117 | 9/1958 | Great Britain. |
| 820,958 | 9/1959 | Great Britain. |

MORRIS O. WOLK, *Primary Examiner.*

G. D. MITCHELL, M. H. SILVERSTEIN, J. SCOVRONEK, *Assistant Examiners.*